(12) United States Patent
Koh et al.

(10) Patent No.: US 9,769,405 B2
(45) Date of Patent: Sep. 19, 2017

(54) IMAGE SENSOR FOR SUPPLYING A DIFFERENT VOLTAGE TO PIXELS BASED ON ILLUMINATION CHANGE, OPERATION METHOD THEREOF, AND DEVICE HAVING AN IMAGE SENSOR

(71) Applicants: Kyoung Min Koh, Hwaseong-si (KR); Kwang Hyun Lee, Seongnam-si (KR); Shin Hoo Kim, Suwon-si (KR); Ju Ha Kim, Yongin-si (KR); Ji Yong Kim, Gimpo-si (KR); Seok Yong Park, Anyang-si (KR); Jae Cheol Yun, Seoul (KR); Jae Jin Jung, Seoul (KR); Woong Joo, Seoul (KR)

(72) Inventors: Kyoung Min Koh, Hwaseong-si (KR); Kwang Hyun Lee, Seongnam-si (KR); Shin Hoo Kim, Suwon-si (KR); Ju Ha Kim, Yongin-si (KR); Ji Yong Kim, Gimpo-si (KR); Seok Yong Park, Anyang-si (KR); Jae Cheol Yun, Seoul (KR); Jae Jin Jung, Seoul (KR); Woong Joo, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 194 days.

(21) Appl. No.: 14/452,088

(22) Filed: Aug. 5, 2014

(65) Prior Publication Data

US 2015/0062397 A1    Mar. 5, 2015

(30) Foreign Application Priority Data

Sep. 3, 2013  (KR) .......................... 10-2013-0105419

(51) Int. Cl.
H04N 5/369    (2011.01)
H04N 5/359    (2011.01)
H04N 5/374    (2011.01)

(52) U.S. Cl.
CPC ......... *H04N 5/3698* (2013.01); *H04N 5/3594* (2013.01); *H04N 5/374* (2013.01)

(58) Field of Classification Search
None
See application file for complete search history.

(56) References Cited

U.S. PATENT DOCUMENTS 6,958,776 B2   10/2005   Mendis et al.
7,235,772 B2    6/2007   Ko et al.
7,268,331 B2    9/2007   Koyama
(Continued)

FOREIGN PATENT DOCUMENTS

KR          100714611 B1     4/2007
KR        20120115886 A    10/2012
(Continued)

*Primary Examiner* — Shahbaz Nazrul
(74) *Attorney, Agent, or Firm* — Harness, Dickey & Pierce, P.L.C.

(57) ABSTRACT

An image sensor includes a pixel array including a plurality of pixels, a row driver configured to control an operation of each of the plurality of pixels, a voltage supply line connected to a reset transistor included in each of the plurality of pixels, and a voltage supply circuit which detects a signal from the voltage supply line and supplies one of a first voltage and a second voltage to the voltage supply line based on the signal from the voltage supply line.

17 Claims, 26 Drawing Sheets

(56) References Cited

U.S. PATENT DOCUMENTS

| | | | | |
|---|---|---|---|---|
| 7,440,012 B2* | 10/2008 | Borg | | H04N 5/235 |
| | | | | 348/229.1 |
| 7,652,697 B2 | 1/2010 | Ahn | | |
| 7,714,920 B2* | 5/2010 | Inagaki | | H04N 5/3577 |
| | | | | 348/301 |
| 8,004,601 B2* | 8/2011 | Watanabe | | H04N 5/23241 |
| | | | | 348/222.1 |
| 8,477,224 B2* | 7/2013 | Ogura | | H04N 5/3595 |
| | | | | 250/208.1 |
| 9,247,164 B1* | 1/2016 | Thor | | H04N 5/2176 |
| 2010/0097508 A1* | 4/2010 | Yanagita | | H01L 27/14603 |
| | | | | 348/301 |
| 2010/0110261 A1* | 5/2010 | Ito | | H04N 5/335 |
| | | | | 348/311 |
| 2010/0238336 A1* | 9/2010 | Okamoto | | H04N 5/357 |
| | | | | 348/308 |
| 2011/0050945 A1* | 3/2011 | Konno | | H04N 5/232 |
| | | | | 348/222.1 |
| 2011/0062310 A1* | 3/2011 | Kudo | | H04N 5/2176 |
| | | | | 250/208.1 |
| 2011/0215323 A1 | 9/2011 | Kurokawa et al. | | |
| 2012/0257093 A1 | 10/2012 | Sa et al. | | |
| 2013/0020466 A1 | 1/2013 | Ayers et al. | | |
| 2013/0193305 A1* | 8/2013 | Xu | | H04N 5/376 |
| | | | | 250/208.1 |
| 2013/0215310 A1* | 8/2013 | Toyoguchi | | H01L 27/14806 |
| | | | | 348/308 |
| 2013/0306841 A1* | 11/2013 | Tate | | H04N 5/3698 |
| | | | | 250/208.1 |
| 2014/0085521 A1* | 3/2014 | Inui | | H04N 5/355 |
| | | | | 348/301 |
| 2015/0076327 A1* | 3/2015 | Amikawa | | H04N 5/355 |
| | | | | 250/208.1 |
| 2015/0077609 A1* | 3/2015 | Okamoto | | H04N 5/3698 |
| | | | | 348/303 |
| 2015/0288899 A1* | 10/2015 | Shigeta | | H04N 5/3698 |
| | | | | 348/294 |
| 2015/0338531 A1* | 11/2015 | Niekawa | | G01T 1/247 |
| | | | | 250/370.08 |
| 2016/0014363 A1* | 1/2016 | Kito | | H04N 5/378 |
| | | | | 348/308 |
| 2016/0179164 A1* | 6/2016 | Park | | G06F 1/324 |
| | | | | 713/322 |
| 2017/0013221 A1* | 1/2017 | Yanagida | | H04N 5/3745 |

FOREIGN PATENT DOCUMENTS

| | | |
|---|---|---|
| KR | 20120122320 A | 11/2012 |
| KR | 20120122627 A | 11/2012 |

\* cited by examiner

IMAGE SENSOR FOR SUPPLYING A DIFFERENT VOLTAGE TO PIXELS BASED ON ILLUMINATION CHANGE, OPERATION METHOD THEREOF, AND DEVICE HAVING AN IMAGE SENSOR

CROSS-REFERENCE TO RELATED APPLICATIONS

This application claims priority under 35 U.S.C. §119(a) from Korean Patent Application No. 10-2013-0105419 filed on Sep. 3, 2013, the disclosure of which is hereby incorporated by reference in its entirety.

BACKGROUND

Example embodiments of inventive concepts relate to an image sensor, such as an image sensor which may supply different voltages to pixels of a pixel array based on an illumination change, an operation method thereof, and/or devices having the image sensor.

An image sensor is a device converting an optical image into an electrical signal. The image sensor is classified into a charged coupled device (CCD) image sensor and a complementary metal-oxide-semiconductor (CMOS) image sensor.

The CMOS image sensor or a CMOS image sensor chip is a type of an active pixel sensor manufactured using a CMOS semiconductor process. The CMOS image sensor chip includes a pixel array having a plurality of pixels. Each of the plurality of pixels includes a photo-electric conversion element which converts an optical signal into an electrical signal, and an additional circuit which converts the electrical signal into digital data.

The photo-electric conversion element such as a photo-diode generates electrons proportional to illumination. When the CMOS image sensor chip is exposed to high illumination, excessive electrons are generated in the photo-electric conversion element, so that the CMOS image sensor chip may operate in an abnormal state.

SUMMARY

An example embodiment is directed to an image sensor, including a pixel array including a plurality of pixels, a row driver configured to control an operation of each of the plurality of pixels, a first voltage supply line connected to a reset transistor included in each of the plurality of pixels, and a voltage supply circuit configured to detect a signal from the first voltage supply line, and supply one of a first voltage and a second voltage to the first voltage supply line. Each of the plurality of pixels further includes a source follower connected to the first voltage supply line.

According to an example embodiment, the voltage supply circuit includes a comparator configured to compare a reference signal with the signal from the first voltage supply line and generate a comparison signal, a voltage generator configured to generate the second voltage based on the first voltage, and a switch configured to supply the one of the first voltage and the second voltage to the first voltage supply line based on the comparison signal. The reference signal and the signal are one of a voltage or a current.

According to another example embodiment, the voltage supply circuit includes a comparator configured to compare a reference signal with the signal from the first voltage supply line and generate a comparison signal, a voltage generator which generates the first voltage and the second voltage based on an external voltage, a switch configured to supply the one of the first voltage and the second voltage to the first voltage supply line based on the comparison signal. The reference signal and the signal are one of a voltage or a current.

According to still another example embodiment, the voltage supply circuit includes an input terminal and an output terminal, the input terminal connected to the first voltage supply line, the input terminal configured to receive the first voltage, the voltage generator configured to generate the second voltage based on the first voltage and output the second voltage through the output terminal, and a diode having a cathode and an anode, the cathode connected to the first voltage supply line and the anode connected to the output terminal.

According to still another example embodiment, the voltage supply circuit includes a voltage generator configured to generate the first voltage and the second voltage based on an external voltage, output the first voltage through a first output terminal connected to the first voltage supply line and output the second voltage through a second output terminal, and a diode having a cathode and an anode, the cathode connected to the first voltage supply line and the anode connected to the second output terminal.

According to another example embodiment, each of the plurality of pixels further includes a source follower connected to a second voltage supply line supplying a third voltage.

The voltage supply circuit includes a comparator configured to compare a reference signal with the signal from the first voltage supply line and generate a comparison signal, a voltage generator configured to generate the first voltage and the second voltage based on the third voltage, and a switch which supplies the first voltage or the second voltage to the first voltage supply line based on the comparison signal. The reference signal and the signal are one of a voltage or a current.

The voltage supply circuit includes a comparator configured to compare a reference signal with the signal from the first voltage supply line and generate a comparison signal, a voltage generator configured to generate the first voltage, the second voltage, and the third voltage based on an external voltage, and a switch configured to supply the one of the first voltage and the second voltage to the first voltage supply line based on the comparison signal. The reference signal and the signal are either voltages or currents.

The voltage supply circuit includes a voltage generator having an input terminal and an output terminal, the input terminal connected to the second voltage supply line, the first output terminal connected to the first voltage supply line, the voltage generator configured to generate the first voltage and the second voltage based on the third voltage, output the first voltage through the first output terminal, and output the second voltage through the second output terminal, and a diode having a cathode and an anode, the cathode connected to the first voltage supply line and the anode connected to the second output terminal.

The voltage supply circuit includes a voltage generator configured to generate the first voltage, the second voltage, and the third voltage based on an external voltage, output the first voltage through a first output terminal connected to the first voltage supply line, output the second voltage through a second output terminal, and outputs the third voltage to the second voltage supply line, and a diode having a cathode and an anode, the cathode connected to the first voltage supply line and the anode connected to the second output terminal. The first voltage is higher than the second voltage.

An example embodiment of inventive concepts is directed to an image processing device, including an image sensor configured to output data, a display device, and a processor configured to process the data output from the image sensor and transmits the processed data to the display device for a display.

The image sensor includes a pixel array including a plurality of pixels, a row driver configured to control an operation of each of the plurality of pixels, a first voltage supply line connected to a reset transistor included in each of the plurality of pixels, a voltage supply circuit configured to detect a signal from the first voltage supply line and supply one of a first voltage and a second voltage to the first voltage supply line based on a result of the detection.

The image processing device may be one of a smart phone, tablet PC, a mobile internet device, and a digital camera.

An example embodiment of inventive concepts is directed to a method of operating an image sensor including a plurality of pixels, the method including, supplying a first voltage to a reset transistor in each of the plurality of pixels through a first voltage supply line, detecting a current flowing in the first voltage supply line, and supplying one of the first voltage and a second voltage to the first voltage supply line based on a result of the detection, the second voltage being lower than the first voltage.

The method of operating an image sensor further includes, supplying a third voltage to a source follower included in each of the plurality of pixels through a second voltage supply line while supplying the first voltage. The first voltage is higher than the third voltage, and the third voltage is higher than the second voltage.

At least one example embodiment discloses an image sensor including a pixel array including a plurality of pixels and a voltage supply circuit configured to supply a voltage to the plurality of pixels based on electrons accumulated in at least a selected pixel of the plurality of pixels.

BRIEF DESCRIPTION OF THE DRAWINGS

These and/or other aspects and advantages of inventive concepts will become apparent and more readily appreciated from the following description of the embodiments, taken in conjunction with the accompanying drawings of which.

DETAILED DESCRIPTION OF EXAMPLE EMBODIMENTS

Figure 1:
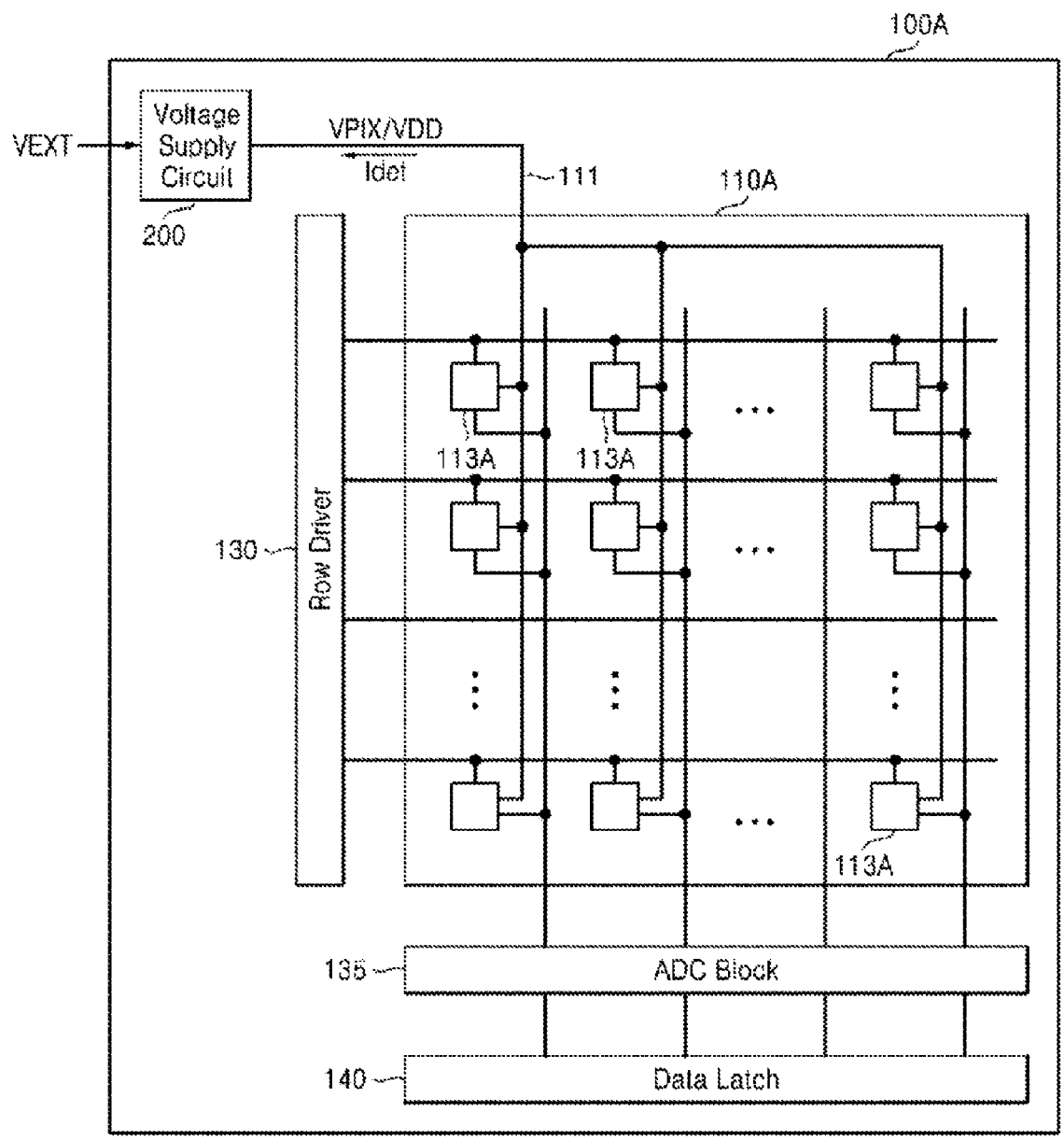
FIG. 1 is a block diagram of an image sensor including a voltage supply circuit according to an example embodiment of inventive concepts.

Inventive concepts now will be described more fully hereinafter with reference to the accompanying drawings, in which example embodiments are shown. Inventive concepts may, however, be embodied in many different forms and should not be construed as limited to the embodiments set forth herein. Rather, example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing example embodiments only and is not intended to be limiting of inventive concepts. As used herein, the singular forms "a", "an" and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image sensor including a voltage supply circuit according to an example embodiment of inventive concepts. Referring to FIG. 1, an image sensor 100A includes a pixel array 110A, a row driver 130, an analog to digital conversion block 135, a data latch 140, and a voltage supply circuit 200. The image sensor 100A may be embodied in an integrated circuit or a CMOS image sensor chip according to a CMOS manufacturing process.

The pixel array 110A includes a plurality of pixels 113A. A reset transistor and a source follower included in each of the plurality of pixels 113A are connected to a voltage supply line 111. Each of the plurality of pixels 113A is connected to each of a plurality of column lines.

The row driver 130 may control an operation of each of the plurality of pixels 113A.

The analog to digital conversion block 135 perform an analog to digital conversion operation on pixel signals output from the plurality of pixels 113A, i.e., pixel signals output through a plurality of column lines, and outputs digital signals to the data latch 140.

The voltage supply circuit 200 may generate a plurality of voltages VPIX and VDD based on an external voltage VEXT input from outside, e.g., the outside of the image sensor 100A.

The voltage supply circuit 200 may detect one of a current Idet flowing in the voltage supply line 111 and a voltage related to the current Idet based on an illumination change, and supply one of a plurality of voltages VPIX and VDD to the voltage supply line 111 based on a result of the detection.

Figure 2:
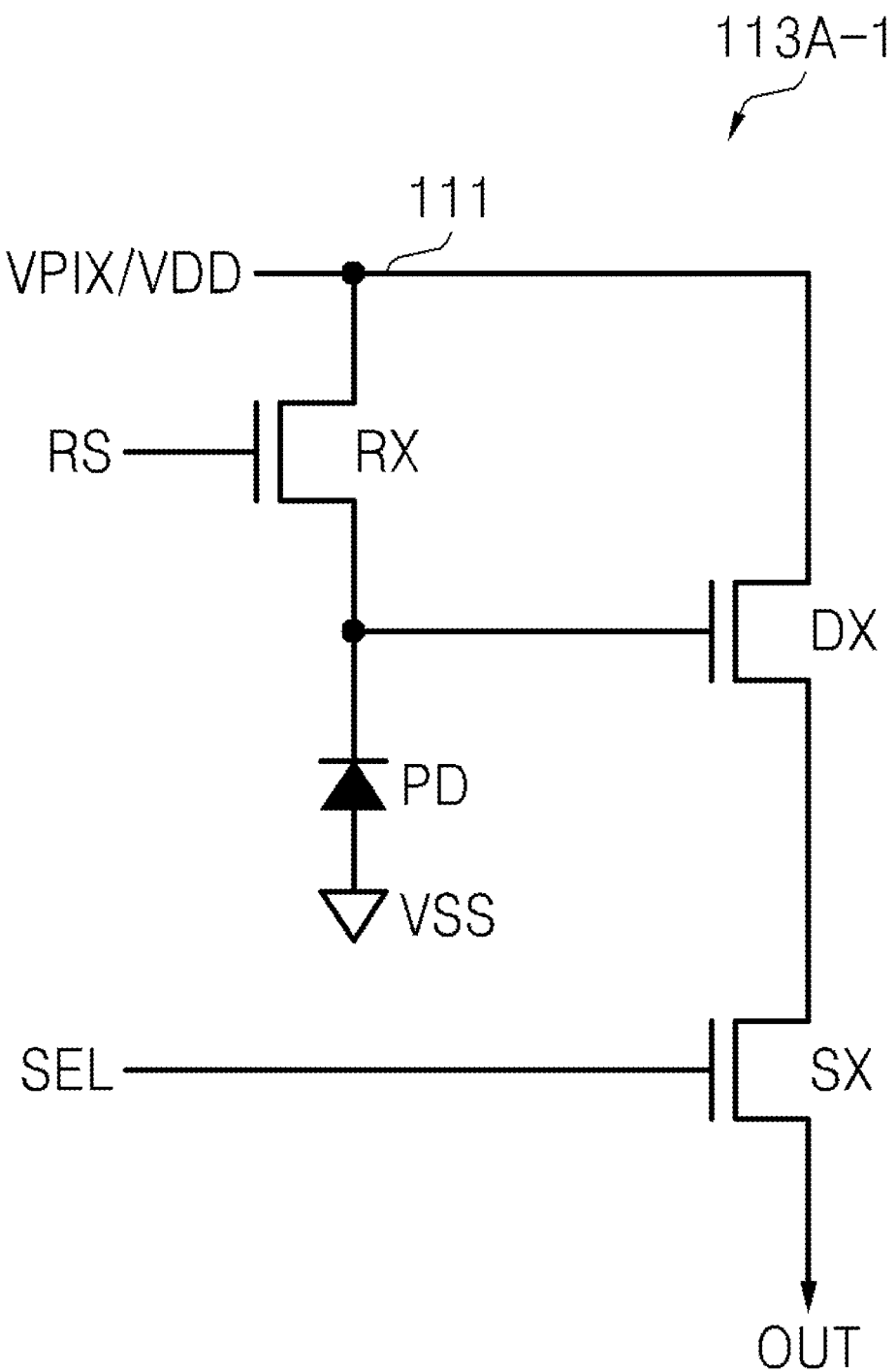
FIG. 2 is an example embodiment of a circuit diagram of a pixel included in the image sensor of FIG. 1.

FIG. 2 is an example embodiment of a circuit diagram of a pixel included in the image sensor of FIG. 1. Referring to FIG. 2, a pixel 113A-1 according to an example embodiment of the pixel 113A included in the pixel array 110A of FIG. 1 is in a three-transistor (TR) structure. The pixel 113A-1 includes one photodiode PD and three transistors RX, DX, and SX.

A reset signal RS controls an operation of a reset transistor RX, and a selection signal SEL controls an operation of a selection transistor SX. An output signal OUT of the selection transistor SX is supplied to a column line. A source of the reset transistor RX and a source of a source follower DX are connected to the voltage supply line 111. Accordingly, the voltage supply line 111 may supply a first voltage VPIX or a second voltage VDD to each transistor RX and DX based on an illumination change. When each pixel 113A is embodied in a three-TR structure, the row driver 130 may generate each control signal RS and SEL at an appropriate timing.

Figure 3:
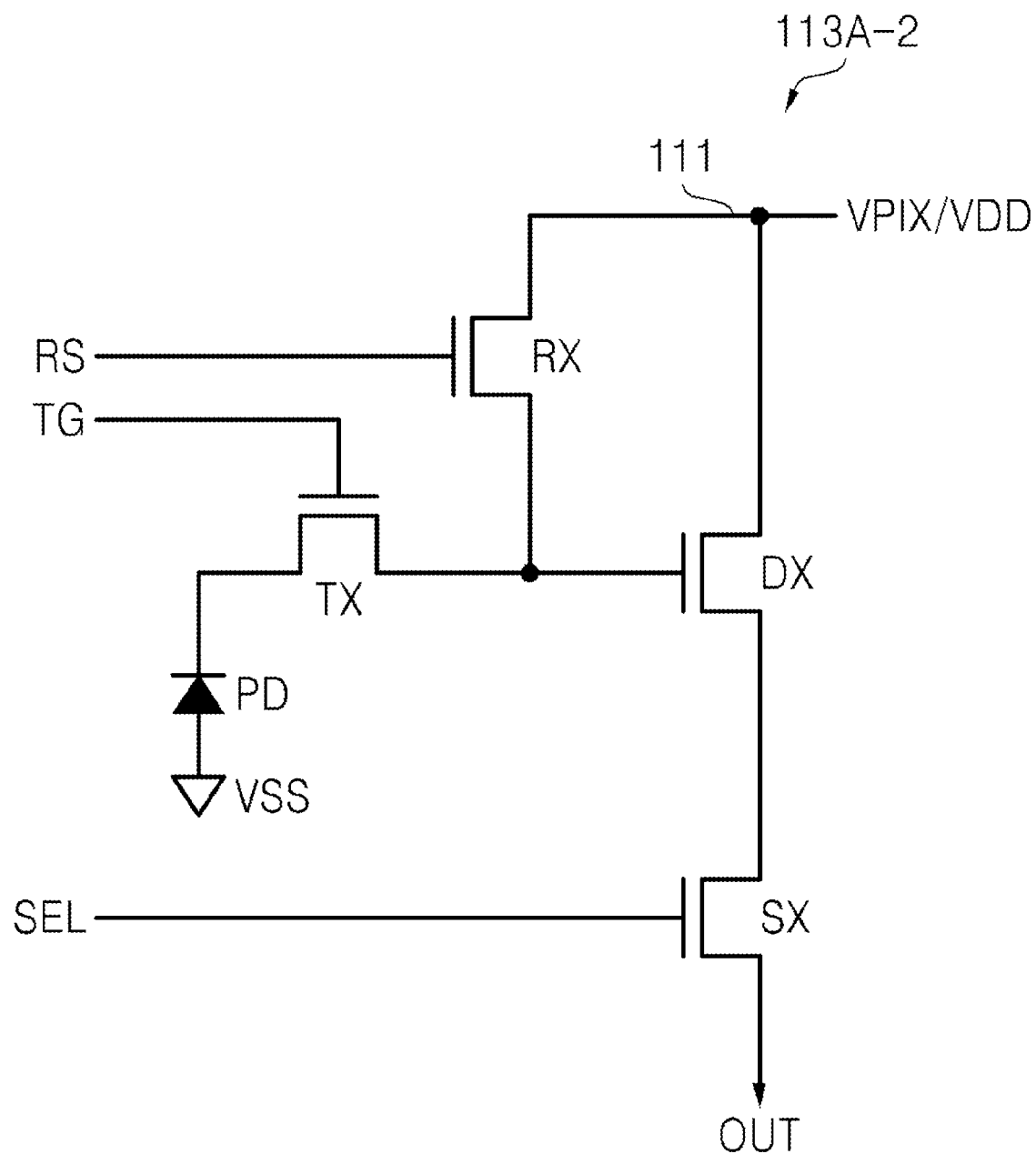
FIG. 3 is another example embodiment of the circuit diagram of the pixel included in the image sensor of FIG. 1.

FIG. 3 is another example embodiment of the circuit diagram of the pixel included in the image sensor of FIG. 1.

Referring to FIG. 3, a pixel 113A-2 according to another example embodiment of the pixel 113A included in the pixel array 110A of FIG. 1 is in a four-TR structure. The pixel 113A-2 includes one photodiode PD and four transistors RX, DX, SX, and TX.

A transmission control signal TG controls an operation of a transmission transistor TX. A source of the reset transistor RX and a source of the source follower DX are connected to the voltage supply line 111. When each pixel 113A is embodied in the four-TR structure, the row driver 130 may generate each control signal RS, SEL, and TG at an appropriate timing.

Figure 4:
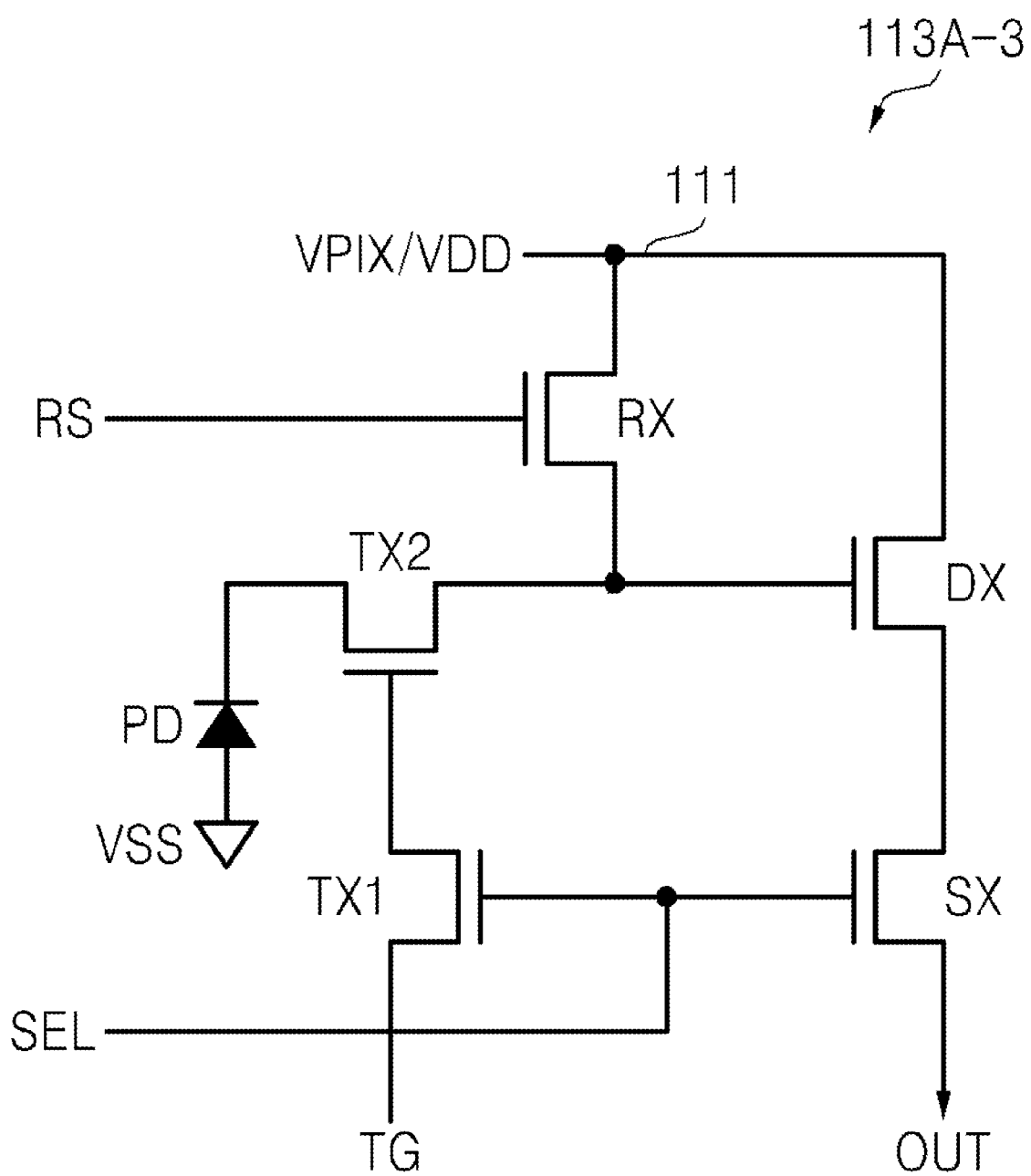
FIG. 4 is still another example embodiment of the circuit diagram of the pixel included in the image sensor of FIG. 1.

FIG. 4 is still another example embodiment of the circuit diagram of the pixel included in the image sensor of FIG. 1. Referring to FIG. 4, a pixel 113A-3 according to still another example embodiment of the pixel 113A included in the pixel array 110A of FIG. 1 is in a five-TR structure. The pixel 113A-3 includes one photodiode PD and five transistors RX, DX, SX, TX1, and TX2.

A selection signal SEL controls an operation of the selection transistor SX and a first transmission transistor TX1, and the transmission control signal TG is supplied to a gate of a second transmission transistor TX2 through the first transmission transistor TX1.

A source of the reset transistor RX and a source of the source follower DX are connected to the voltage supply line 111. The source follower may be referred to as a drive transistor. When each pixel 113A is embodied in the five-TR structure, the row driver 130 may generate each control signal RX, SEL, and TG at an appropriate timing.

Figure 5:
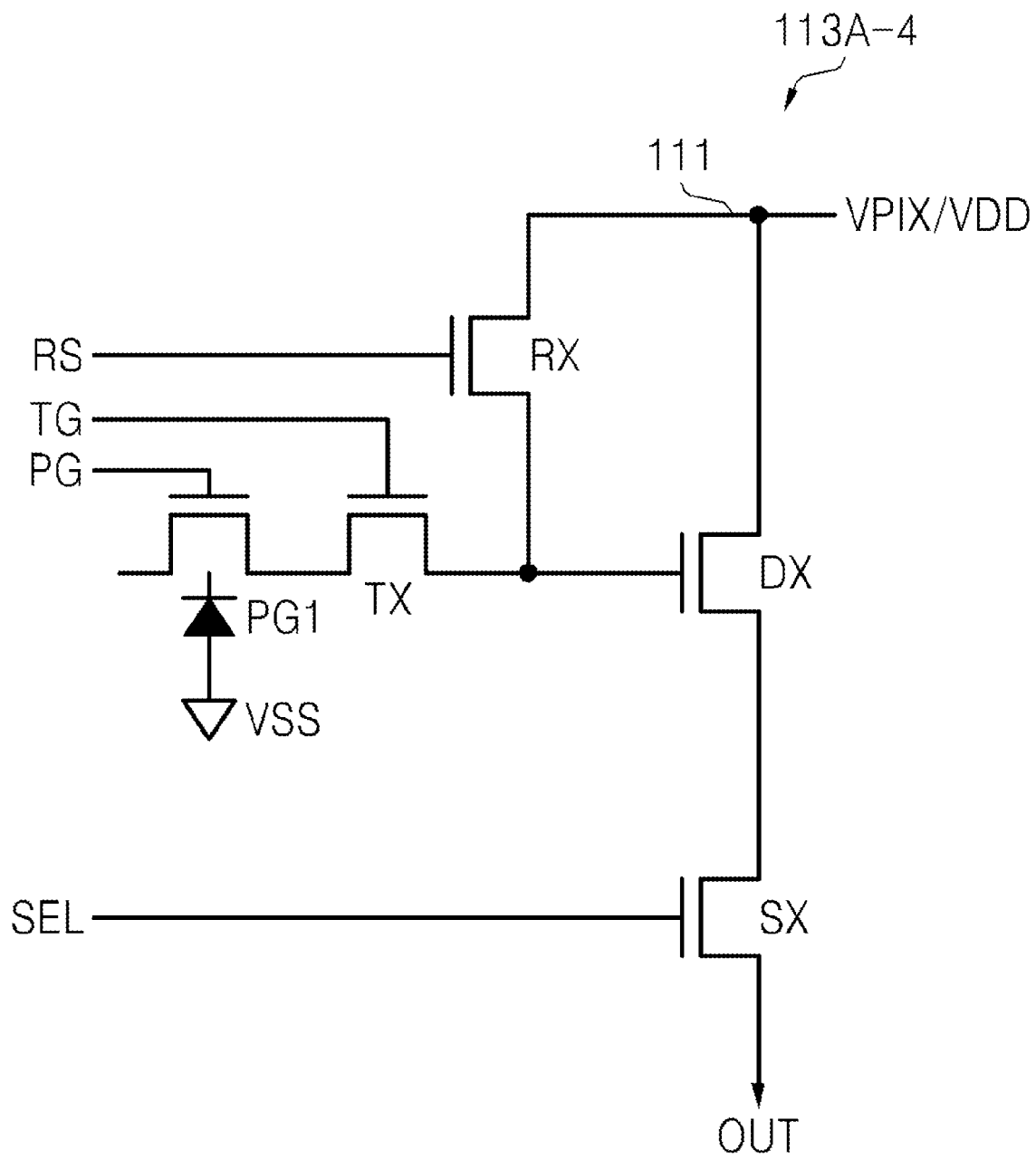
FIG. 5 is still another example embodiment of the circuit diagram of the pixel included in the image sensor of FIG. 1.

FIG. 5 is still another example embodiment of the circuit diagram of the pixel included in the image sensor of FIG. 1. Referring to FIG. 5, a pixel 113A-4 according to still another example embodiment of the pixel 113A included in the pixel array 110A of FIG. 1 is in a photogate structure. The pixel 113A-4 includes one photogate PG1 and four transistors RX, DX, SX, and TX.

A photogate control signal PG controls an operation of the photogate PG1. A source of the reset transistor RX and a source of the source follower DX are connected to the voltage supply line 111. When each pixel 113A is embodied in a photogate structure, the row driver 130 may generate each control signal RS, SEL, TG, and PG at an appropriate timing.

Figure 6:
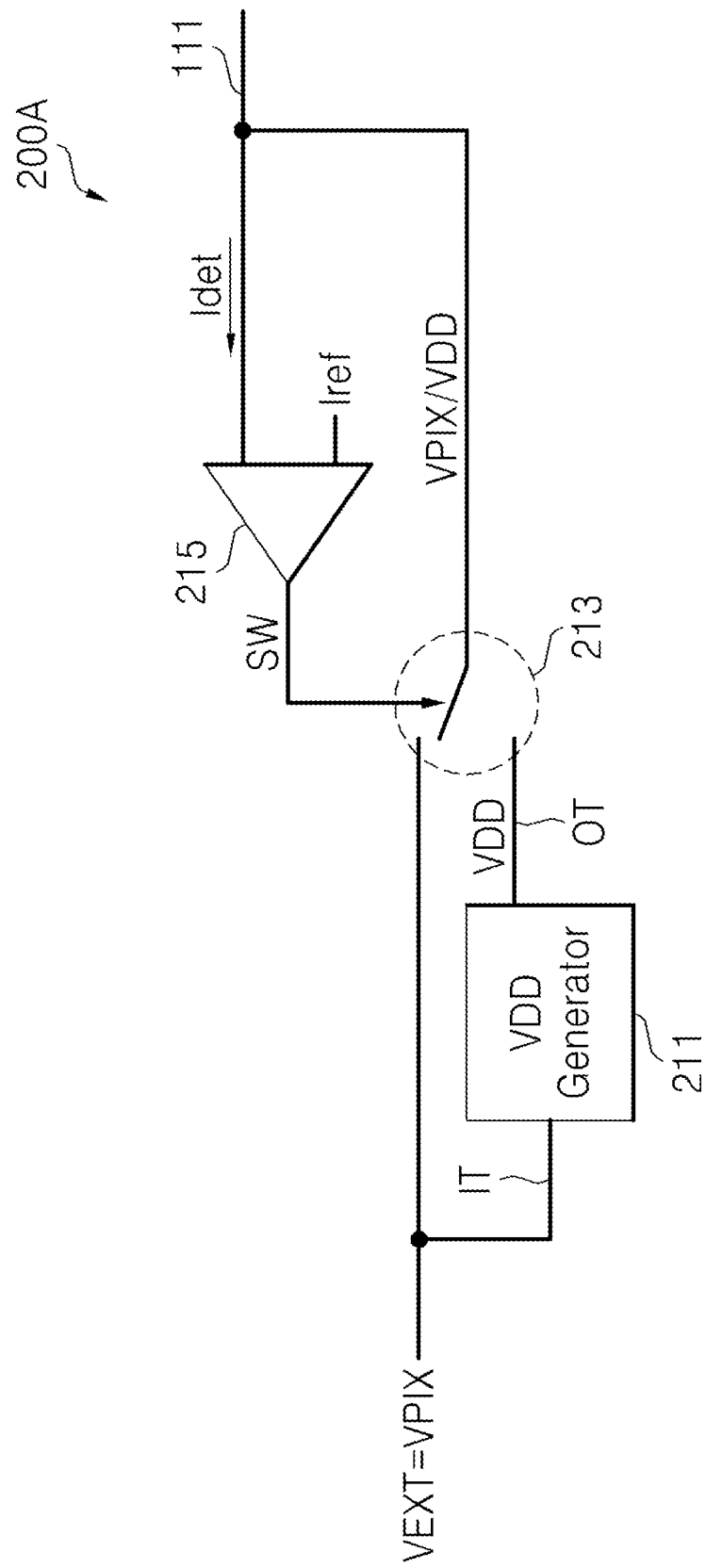
FIG. 6 is an example embodiment of the voltage supply circuit of FIG. 1.

FIG. 6 is an example embodiment of the voltage supply circuit of FIG. 1. Referring to FIGS. 1 to 6, a voltage supply circuit 200A includes a voltage generator 211, a switch 213, and a comparator 215.

The comparator 215 may be embodied in a current comparator, and have a hysteresis characteristic to prevent oscillation. The comparator 215 compares a reference current Iref with a detection current Idet flowing in the voltage supply line 111, and outputs a comparison signal SW corresponding to a result of the comparison.

The detection current Idet may be a current corresponding to a sum of current flowing in the reset transistor RX included in each of the plurality of pixels 113A embodied in the pixel array 110A. For example, an amount of the detection current Idet may be determined by electrons accumulated in a photodiode and/or a floating diffusion node of each pixel 113A.

For example, in a normal illumination environment or low-illumination environment, the detection current Idet which is lower than the reference current Iref flows in the voltage supply line 111, so that the switch 213 supplies a first voltage VPIX to the voltage supply line 111 based on a comparison signal SW.

However, in an abnormal illumination environment or high illumination environment, the detection current Idet which is equal to or greater than the reference current Iref flows in the voltage supply line 111, the switch 213 supplies a second voltage VDD lower than the first voltage VPIX to the voltage supply line 111 based on the comparison signal SW so as to protect the voltage supply line 111 from excessive detection current Idet.

For example, a case where the image sensor 100A shoots or captures sun or a comparably bright light source, or where generated digital signals are saturated according to an analog to digital conversion is referred to as a 'high illumination environment'. When the high illumination environment turns to be a low illumination environment, the first voltage VPIX may be supplied back to the voltage supply line 111.

The voltage generator 211 generates a second voltage VDD based on an external voltage VEXT input to an input terminal IT, i.e., the first voltage VPIX. The switch 213 may supply the first voltage VPIX or the second voltage VDD output through an output terminal OT to each pixel 113A of the pixel array 110A through the voltage supply line 111 based on the comparison signal SW output from the comparator 215. For example, the switch 213 may be embodied in a MOS transistor.

Figure 7:
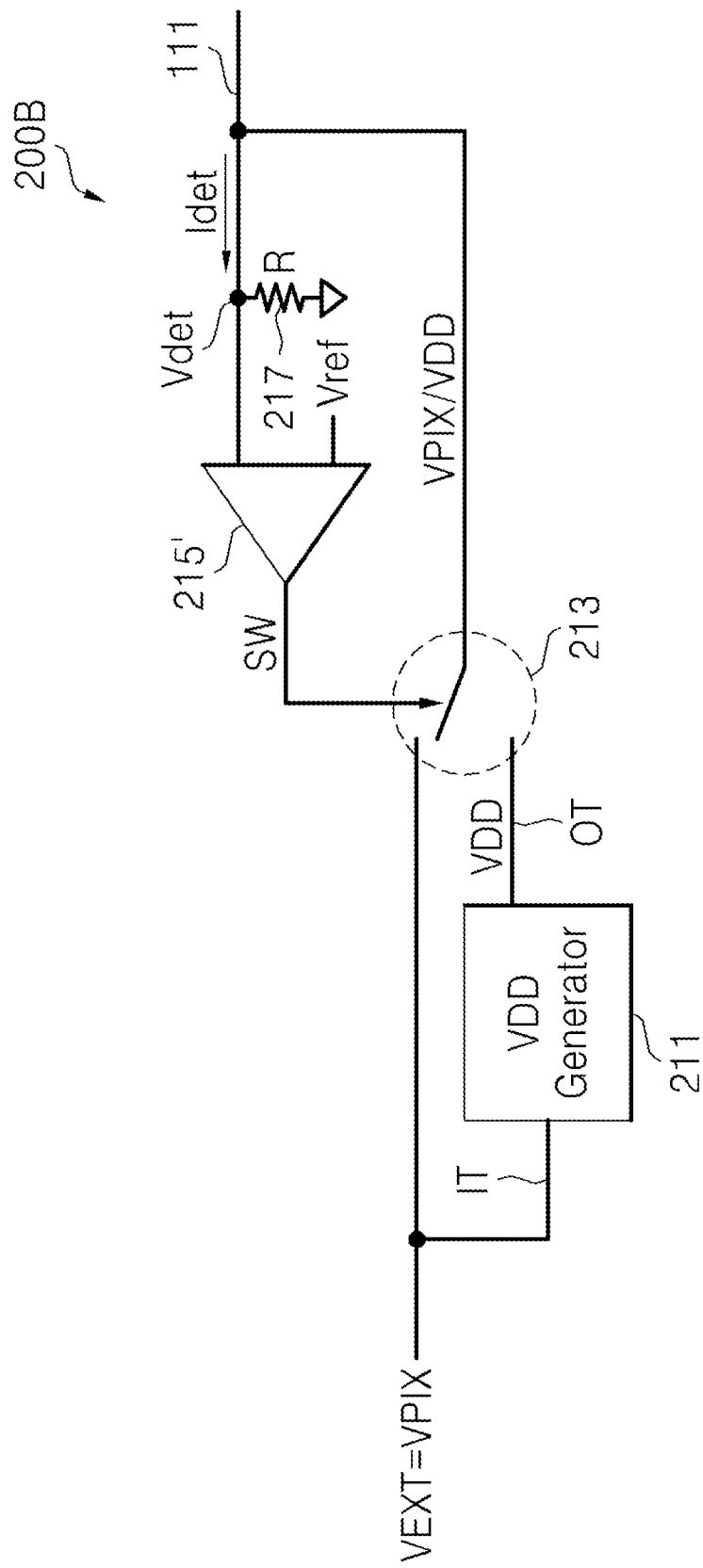
FIG. 7 is another example embodiment of the voltage supply circuit of FIG. 1.

FIG. 7 is another example embodiment of the voltage supply circuit of FIG. 1. Referring to FIGS. 1 to 7, a voltage supply circuit 200B includes a comparator 215', a voltage generator 211, a switch 213, and a resistor circuit 217.

The comparator 215' compares a reference voltage Vref with a detection voltage Vdet, and generates the comparison signal SW according to a result of the comparison. The detection voltage Vdet is determined according to the detection current Idet and a resistance value R of the resistor circuit 217. Here, the comparator 215' may be embodied in a voltage comparator, and have a hysteresis characteristic so as to prevent oscillation.

In a normal illumination environment or a low illumination environment, that is, when the detection voltage Vdet is lower than the reference voltage Vref, the comparator 215' outputs the comparison signal SW for supplying the first voltage VPIX to the voltage supply line 111. However, in an abnormal illumination environment or a high illumination environment, that is, when the detection voltage Vdet is equal to or higher than the reference voltage Vref, the comparator 215' outputs the comparison signal SW for supplying the second voltage VDD to the voltage supply line 111.

The voltage generator 211 generates the second voltage VDD based on the external voltage VEXT input through the input terminal IT, i.e., the first voltage VPIX. The switch 213 supplies the first voltage VPIX or the second voltage VDD output through the output terminal OT to each pixel 113A of the pixel array 110A through the voltage supply line 111 based on the comparison signal SW output from the comparator 215.

Figure 8:
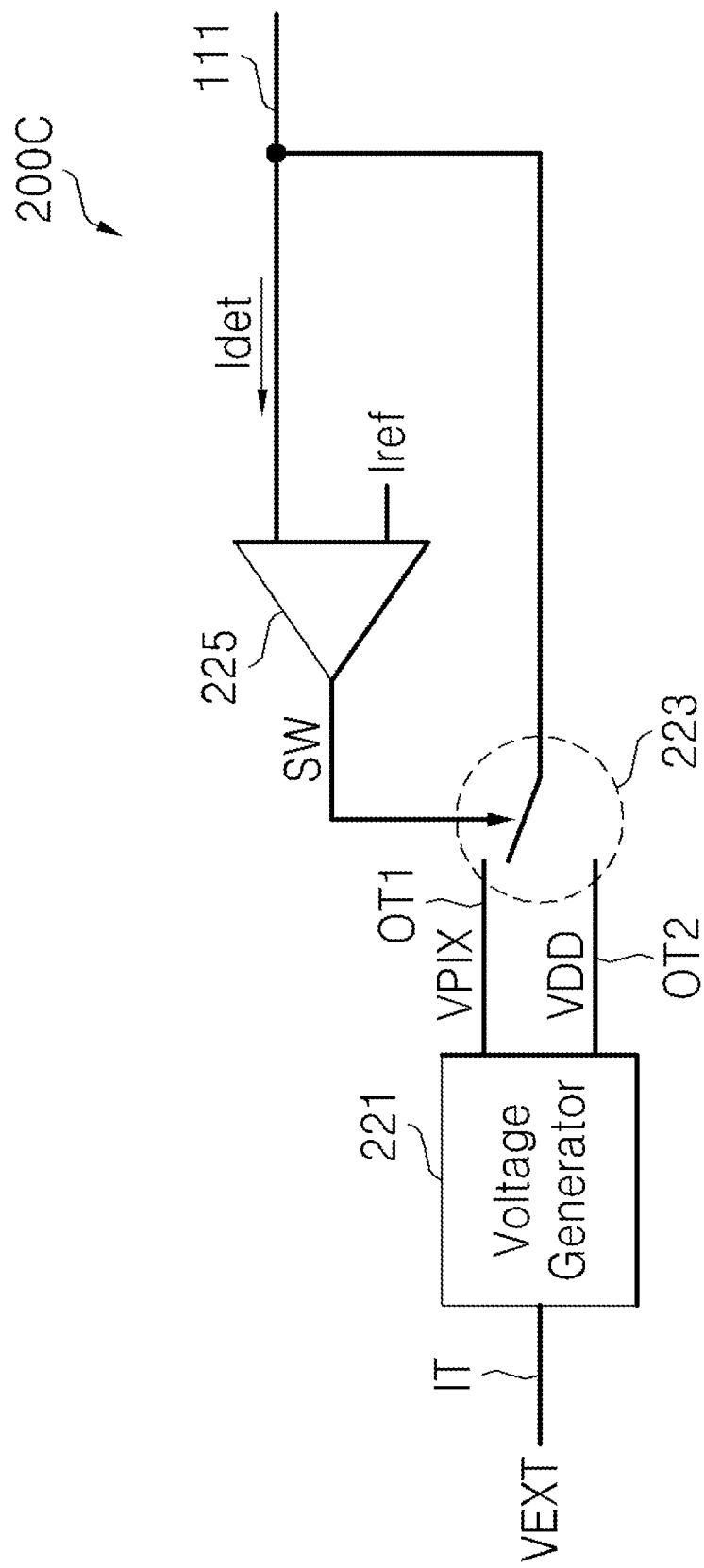
FIG. 8 is still another example embodiment of the voltage supply circuit of FIG. 1.

FIG. 8 is still another example embodiment of the voltage supply circuit of FIG. 1. Referring to FIGS. 1 and 8, the voltage supply circuit 200C includes a comparator 225, a voltage generator 221, and a switch 223. A structure and an operation of the comparator 225 of FIG. 8 are substantially the same as a structure and an operation of the comparator 215 of FIG. 6.

The voltage generator 221 generates the first voltage VPIX and the second voltage VDD based on the external voltage VEXT input through the input terminal IT. The switch 223 supplies the first voltage VPIX output through a first output terminal OT1 or the second voltage VDD output through a second output terminal OT2 to each pixel 113A of the pixel array 110A based on the comparison signal SW output from the comparator 215. For example, the switch 223 may be embodied in a MOS transistor.

Figure 9:
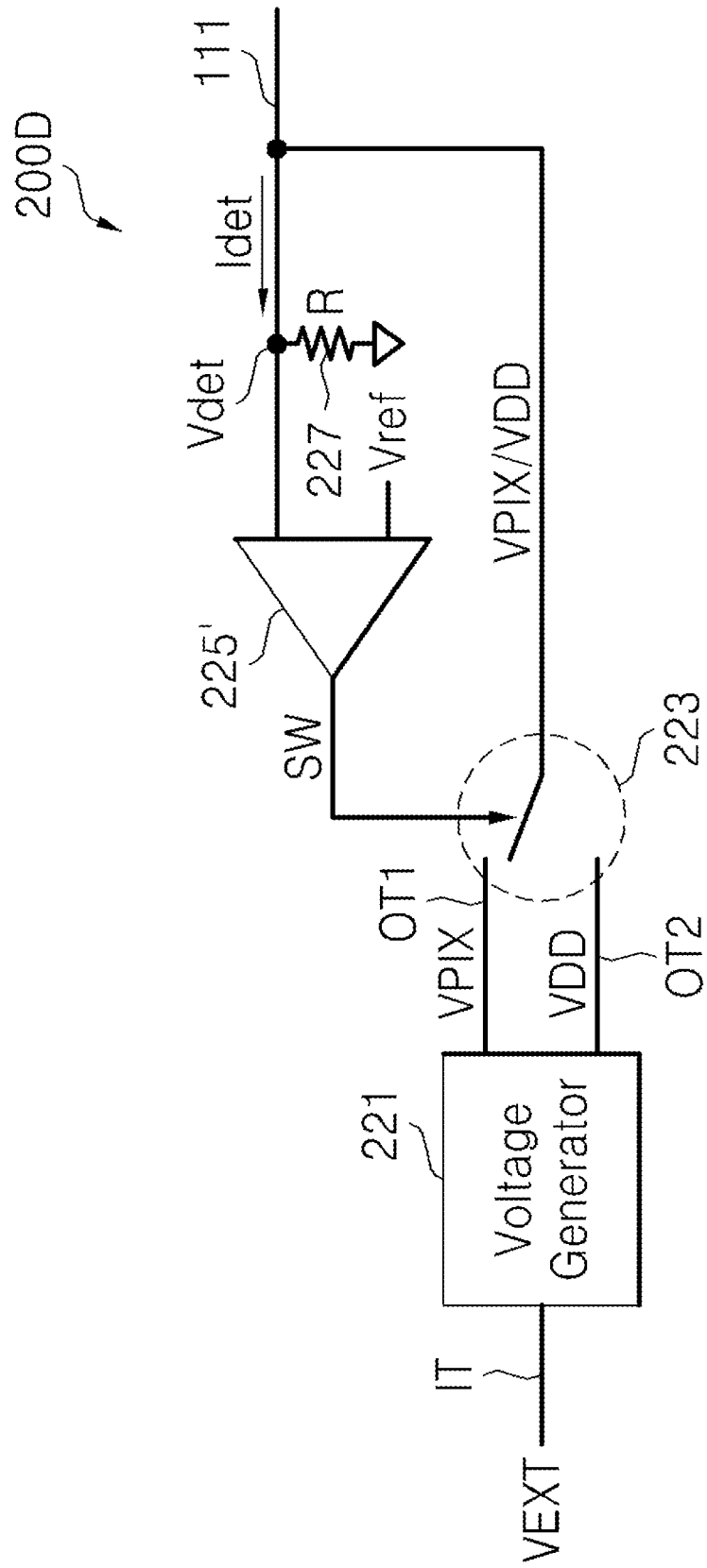
FIG. 9 is still another example embodiment of the voltage supply circuit of FIG. 1.

FIG. 9 is still another example embodiment of the voltage supply circuit of FIG. 1. Referring to FIGS. 1, 8, and 9, a voltage supply circuit 200D includes a voltage generator 221, a switch 223, a comparator 225', and a resistor circuit 227.

A structure and an operation of the comparator 225' of FIG. 9 are substantially the same as the structure and the operation of the comparator 215' of FIG. 7. The detection current Vdet is determined according to the detection current Idet and the resistance value R of the resistor circuit 227.

In a normal illumination environment or a low illumination environment, that is, when the detection voltage Vdet is lower than the reference voltage Vref, the comparator 225' outputs the comparison signal SW so as to supply the first voltage VPIX to the voltage supply line 111. However, in an abnormal illumination environment or a high illumination environment, that is, when the detection voltage Vdet is equal to or higher than the reference voltage Vref, the comparator 225' outputs the comparison signal SW so as to supply the second voltage VDD to the voltage supply line 111.

Figure 10:
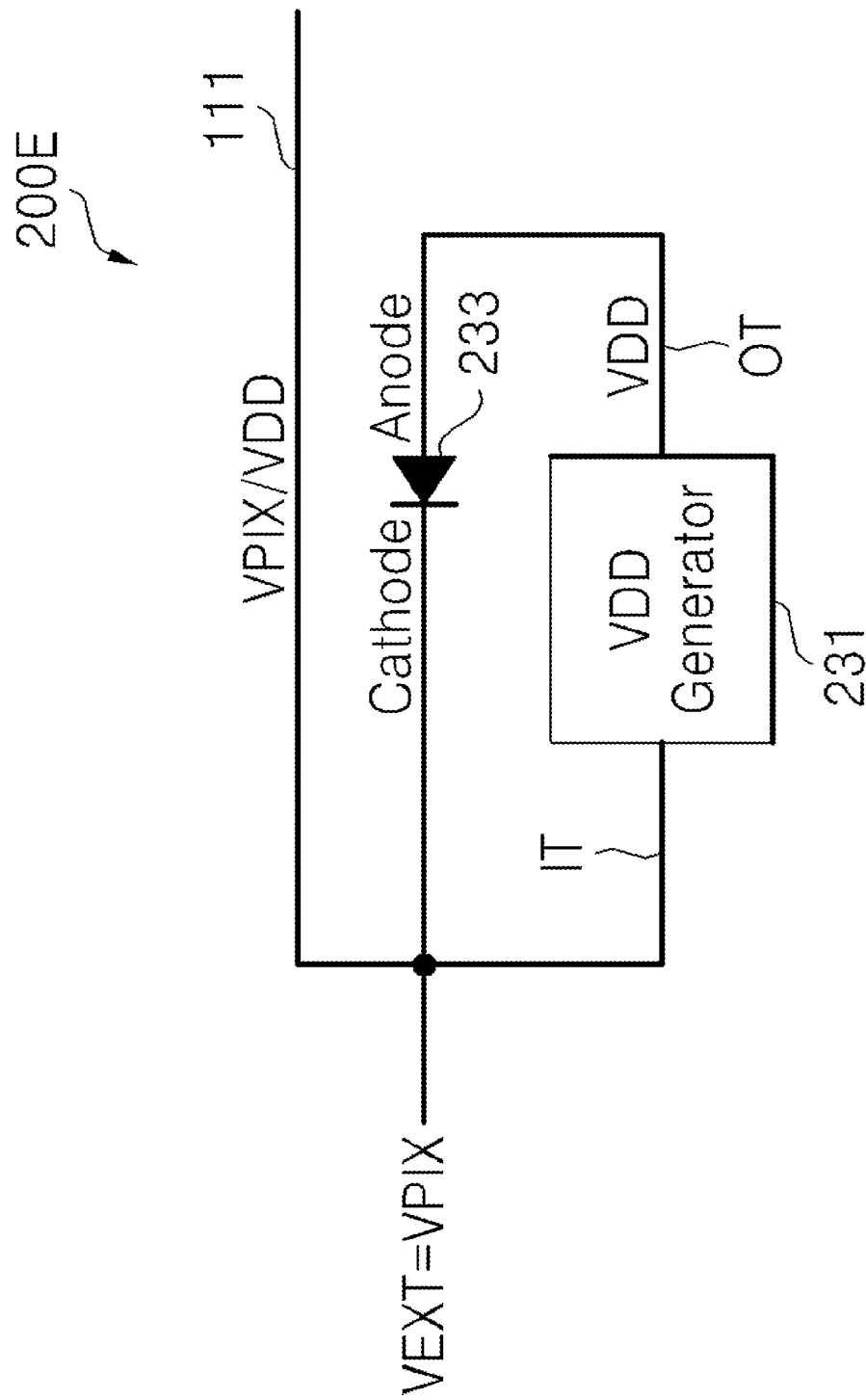
FIG. 10 is still another example embodiment of the voltage supply circuit of FIG. 1.

FIG. 10 is still another example embodiment of the voltage supply circuit of FIG. 1. Referring to FIGS. 1 and 10, a voltage supply circuit 200E includes a voltage generator 231 and a diode 233.

The voltage generator 231 includes an input terminal IT connected to the voltage supply line 111 and an output terminal OT, generates the second voltage VDD based on an external voltage input through the input terminal IT, that is, a first voltage VPIX and outputs the second voltage VDD through the output terminal OT.

The diode 233 includes a cathode connected to the voltage supply line 111 and an anode connected to the output terminal OT.

In a normal illumination environment, the first voltage VPIX supplied to the pixel array 110A through the voltage supply line 111 is higher than the second voltage VDD. Accordingly, the diode 233 maintains an off-state, the first voltage VPIX is supplied to the pixel array 110A through the voltage supply line 111. However, since the detection current Idet rapidly increases in a high illumination environment, the first voltage VPIX supplied to the pixel array 110A through the voltage supply line 111 may be lower than the second voltage VDD. Here, since the diode 233 is turned-on, the second voltage VDD may be supplied to the pixel array 110A through the diode 233 and the voltage supply line 111.

Figure 11:
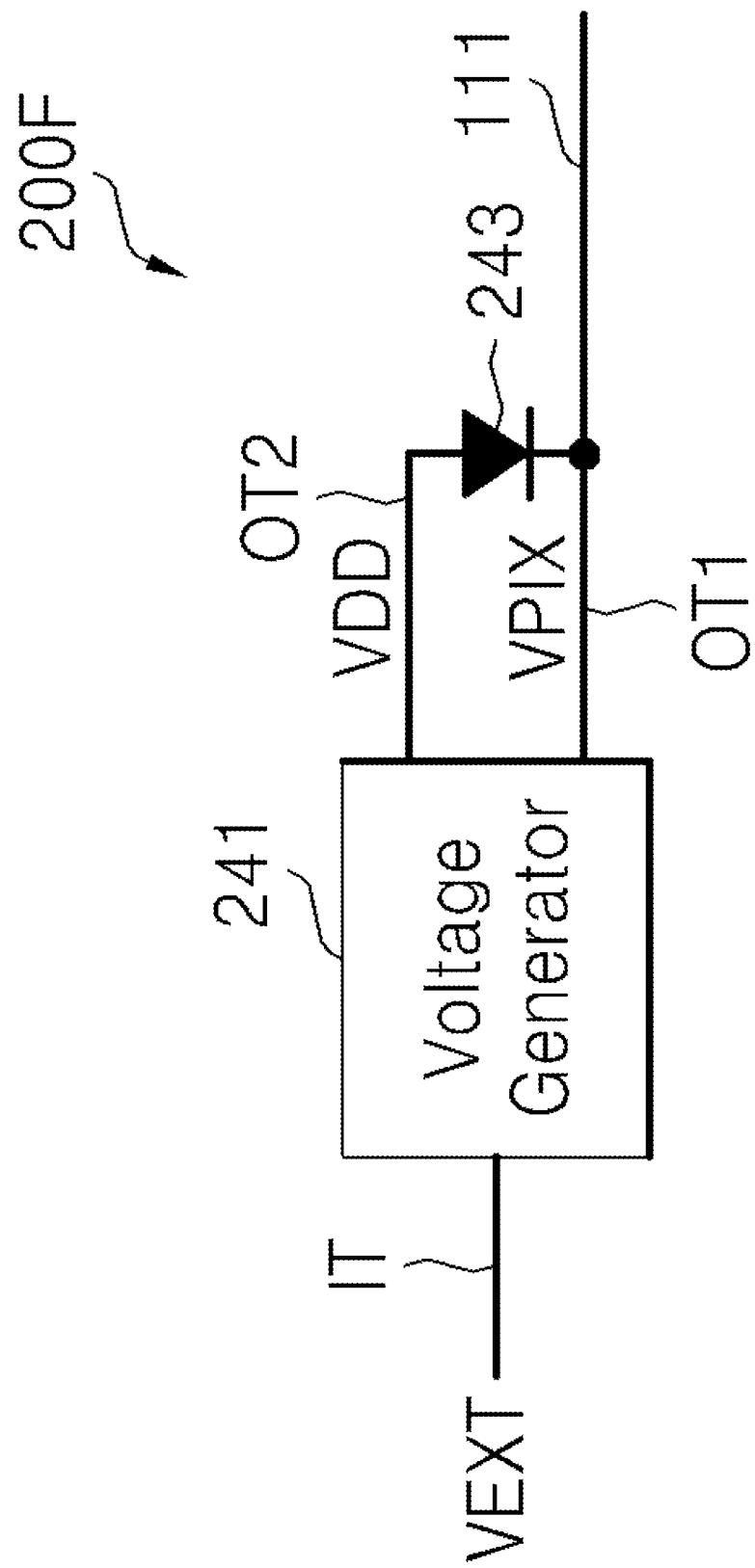
FIG. 11 is still another example embodiment of the voltage supply circuit of FIG. 1.

FIG. 11 is still another example embodiment of the voltage supply circuit of FIG. 1. Referring to FIGS. 1 and 11, the voltage supply circuit 200F includes a voltage generator 241 and a diode 243.

The voltage generator 241 generates the first voltage VPIX and the second voltage VDD based on the external voltage VEXT input from outside through the input terminal IT, outputs the first voltage VPIX through a first output terminal OT1 connected to the first voltage supply line 111, and outputs the second voltage VDD through a second output terminal OT2.

The diode 243 includes a cathode connected to the first voltage supply line 111 and an anode connected to the second output terminal OT2.

In a normal illumination environment, the first voltage VPIX supplied to the pixel array 110A through the voltage supply line 111 is higher than the second voltage VDD.

Accordingly, the diode 233 maintains an off state, so that the first voltage VPIX is supplied to the pixel array 110A through the voltage supply line 111. However, since the detection current Idet rapidly increases in a high illumination environment, the first voltage VPIX supplied to the pixel array 110A through the voltage supply line 111 may be lower than the second voltage VDD. Here, the diode 233 is turned on, so that the second voltage VDD may be supplied to the pixel array 110A through the diode 233 and the voltage supply line 111.

Each diode 233 and 243 may be replaced with various types of diodes having asymmetric conductance.

Figure 12:
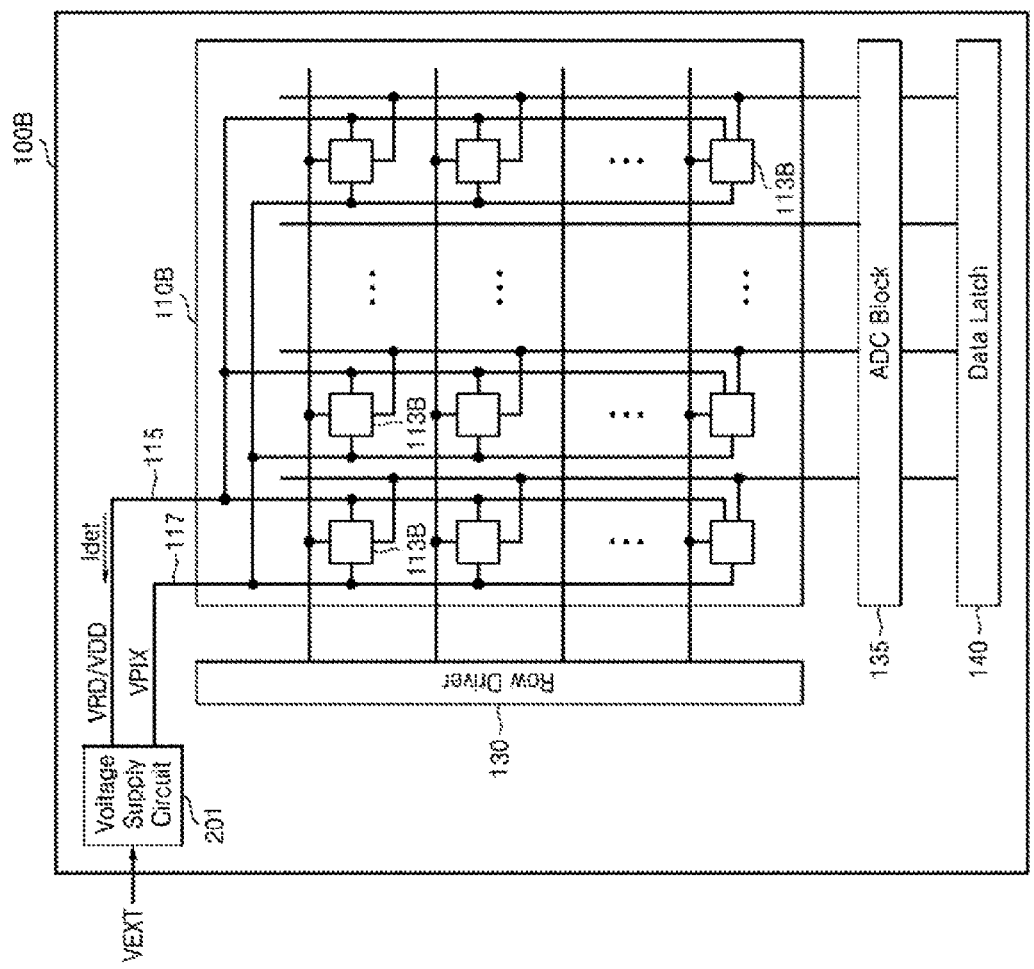
FIG. 12 is a block diagram of an image sensor including a voltage supply circuit according to another example embodiment of inventive concepts.

FIG. 12 is a block diagram of an image sensor including a voltage supply circuit according to another example embodiment of inventive concepts. Referring to FIG. 12, an image sensor 100B includes a pixel array 110B, a row driver 130, an analog to digital conversion block 135, a data latch 140, and a voltage supply circuit 201. The image sensor 100B may be embodied in an integrated circuit or a CMOS image sensor chip according to a CMOS manufacturing process.

The pixel array 110B includes a plurality of pixels 113B. A reset transistor included in each of the plurality of pixels 113B is connected to the first voltage supply line 115, and a source follower included in each of the plurality of pixels 113B is connected to the second voltage supply line 117. That is, the voltage VPIX supplied to the source follower and the voltage VRD or VDD supplied to the reset transistor are separated from each other.

The row driver 130 may control an operation of each of the plurality of pixels 113B.

The analog to digital conversion block 135 performs an analog to digital conversion operation on pixel signals output from the plurality of pixels 113B, and outputs digital signals to the data latch 140.

The voltage supply circuit 201 generates a plurality of voltages VRD, VDD, and VPIX based on the external voltage VEXT input from outside. The voltage supply circuit 201 detects one of the current Idet and a voltage of the first voltage supply line 115, and supplies one VRD or VDD of the plurality of voltages VRD, VDD, and VPIX to the first voltage supply line 115 based on a result of the detection. Here, the voltage supply circuit 201 supplies a voltage VPIX to the second voltage supply line 117.

Figure 13:
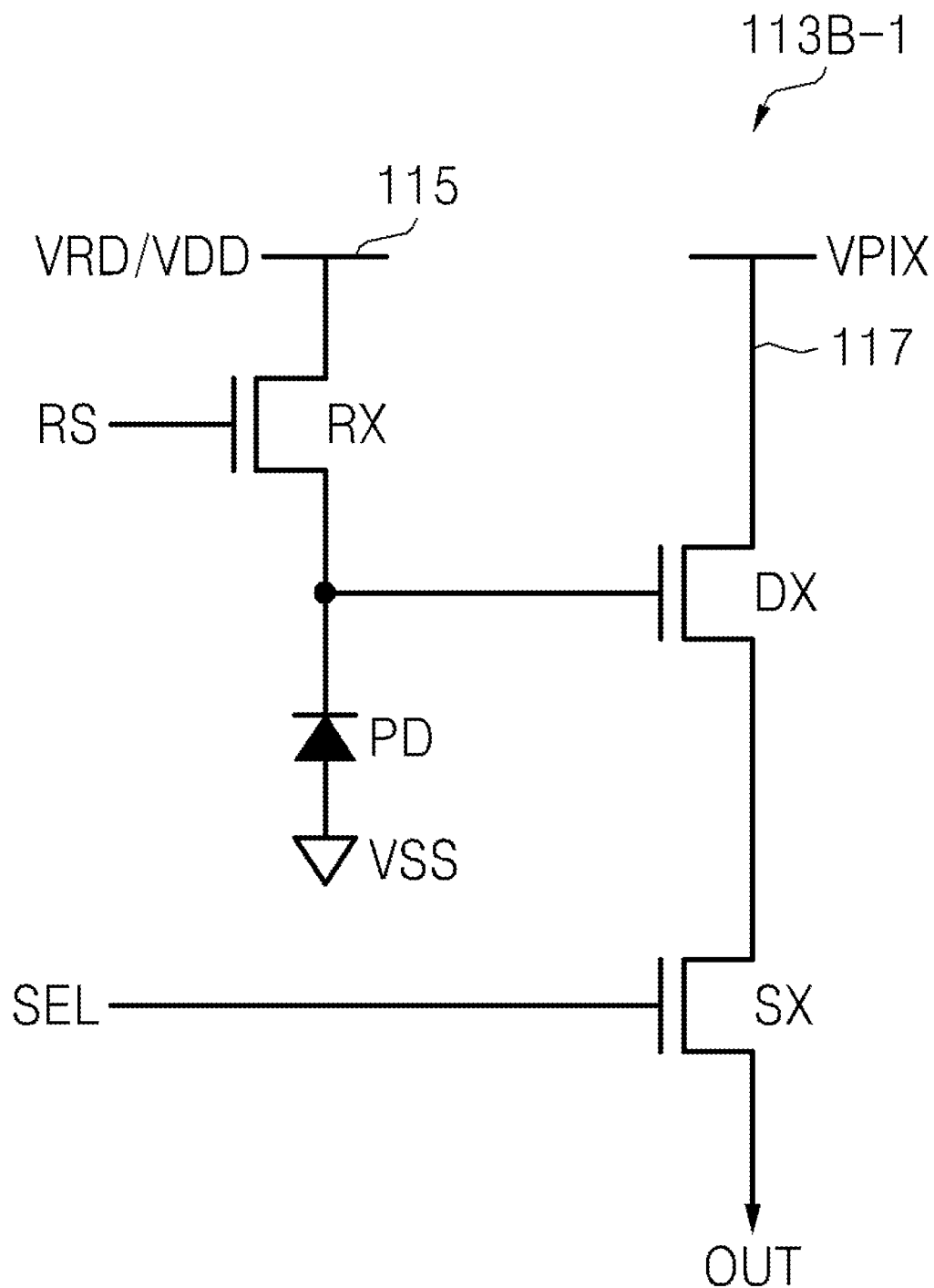
FIG. 13 is an example embodiment of a circuit diagram of a pixel included in the image sensor of FIG. 12.

FIG. 13 is an example embodiment of a circuit diagram of a pixel included in the image sensor of FIG. 12. Referring to FIG. 13, a pixel 113B-1 according to an example embodiment of a pixel 113B included in the pixel array 110B of FIG. 12 is in a three-TR structure. The pixel 113B-1 includes one photodiode PD and three transistors RX, DX, and SX.

Referring to FIGS. 1 to 11, VPIX means a first voltage and VDD means a second voltage. However, referring to FIGS. 12 to 22, it is assumed that VRD means a first voltage, VDD means a second voltage, and VPIX means a third voltage.

A source of the reset transistor RX is connected to the first voltage supply line 115 supplying the first voltage VRD or the second voltage VDD, and a source of the source follower DX is connected to the second voltage supply line 117 supplying the third voltage VPIX. Here, it is assumed that the first voltage VRD is higher than the third voltage VPIX and the third voltage VPIX is higher than the second voltage VDD. When each pixel 113B is embodied in a three-TR structure, the row driver 130 may generate each control signal RS and SEL at an appropriate timing.

Figure 14:
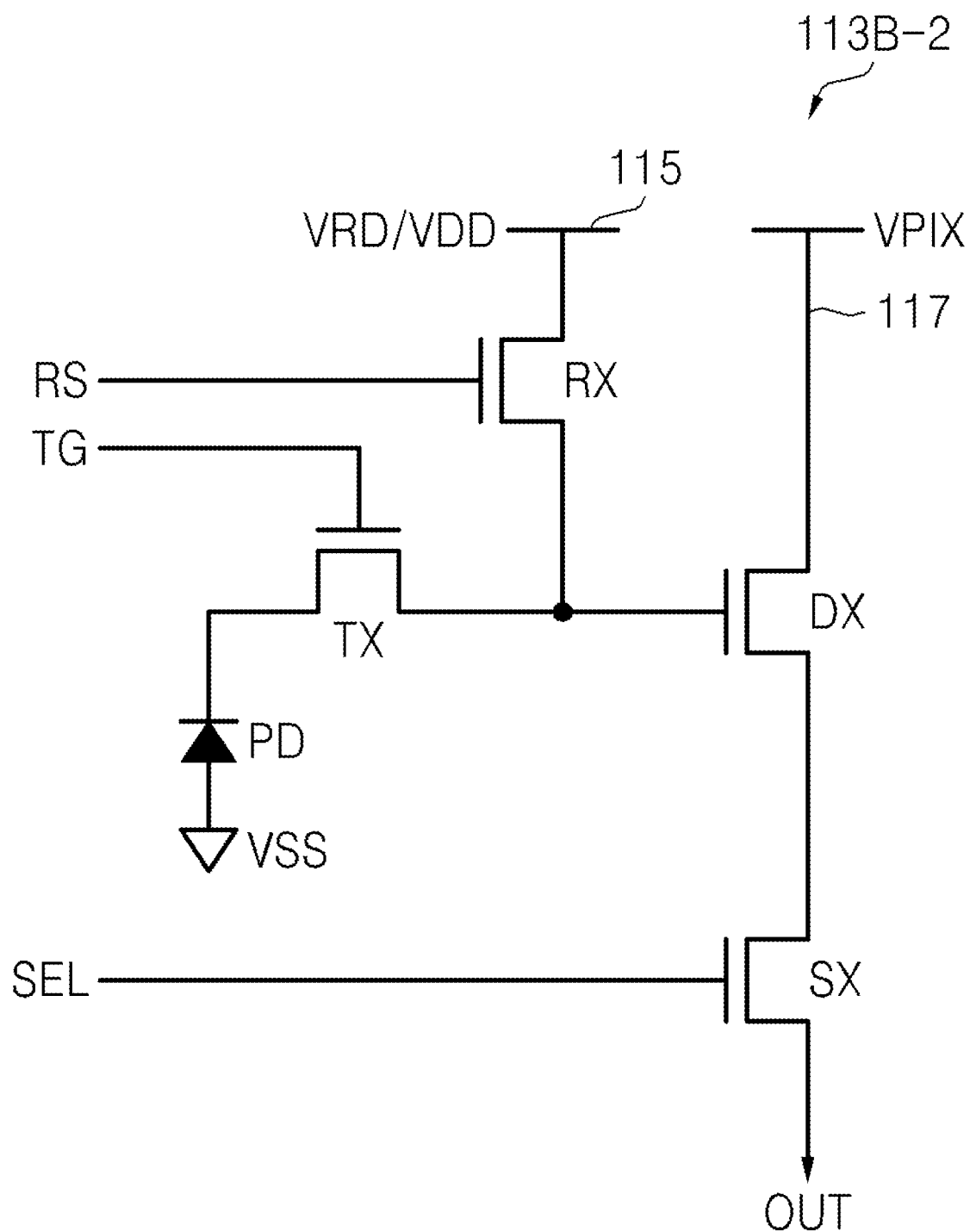
FIG. 14 is another example embodiment of the circuit diagram of the pixel included in the image sensor of FIG. 12.

FIG. 14 is another example embodiment of the circuit diagram of the pixel included in the image sensor of FIG. 12. Referring to FIG. 14, a pixel 113B-2 according to another example embodiment of the pixel 113B included in the pixel array 110B of FIG. 12 is in a four-TR structure. The pixel 113B-2 includes one photodiode PD and four transistors RX, DX, SX, and TX. When each pixel 113B is embodied in the four-TR structure, the row driver 130 generates each control signal RS, SEL and TG at an appropriate timing.

Figure 15:
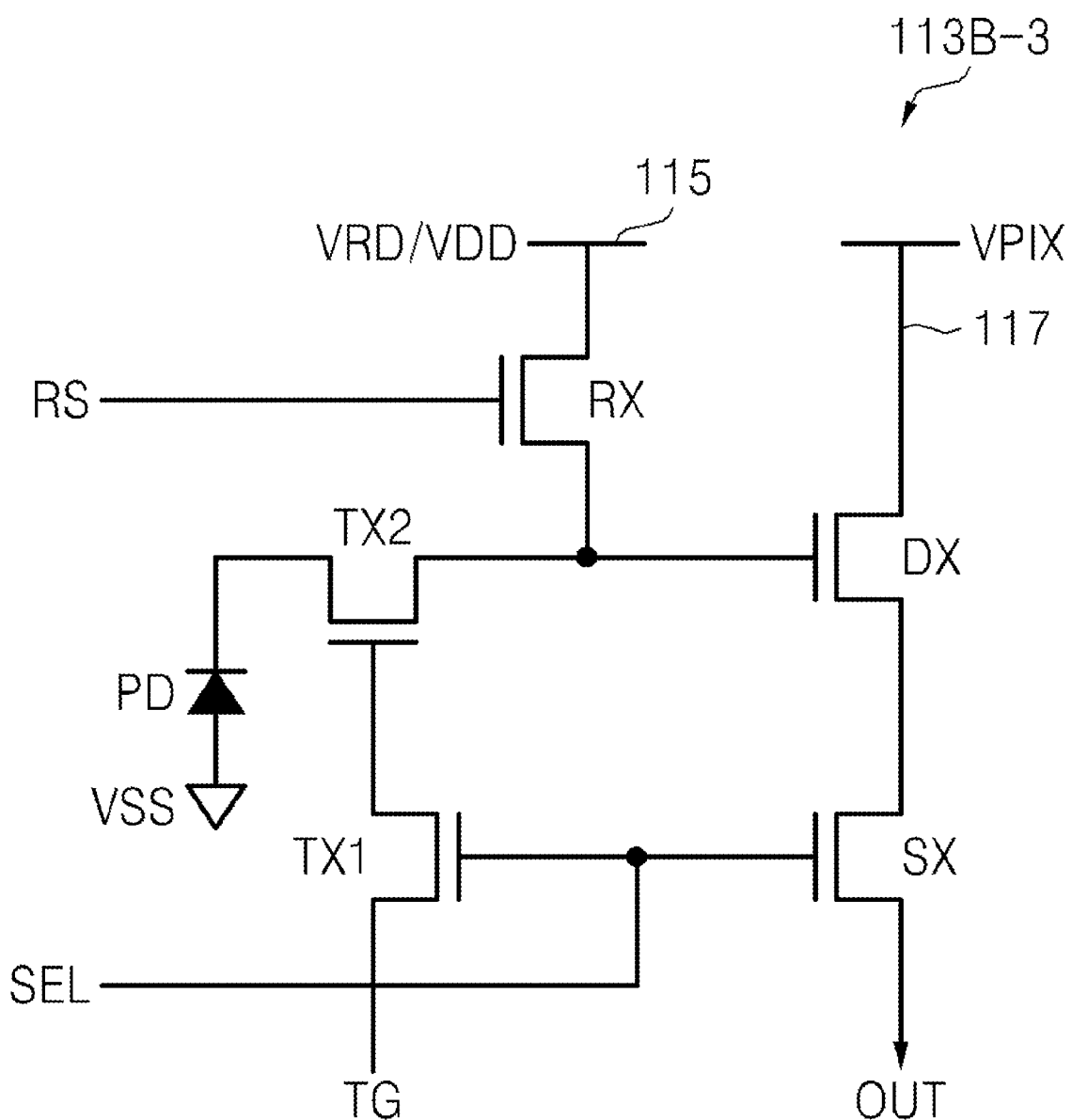
FIG. 15 is still another example embodiment of the circuit diagram of the pixel included in the image sensor of FIG. 12.

FIG. 15 is still another example embodiment of the circuit diagram of the pixel included in the image sensor of FIG. 12. Referring to FIG. 15, a pixel 113B-3 according to still another example embodiment of the pixel 113B included in the pixel array 110B of FIG. 12 is in a five-TR structure. The pixel 113B-3 includes one photodiode PD and five transistors RX, DX, SX, TX1, and TX2. When each pixel 113B is embodied in the five-TR structure, the row driver 130 generates each control signal RS, SEL and TG at an appropriate timing.

Figure 16:
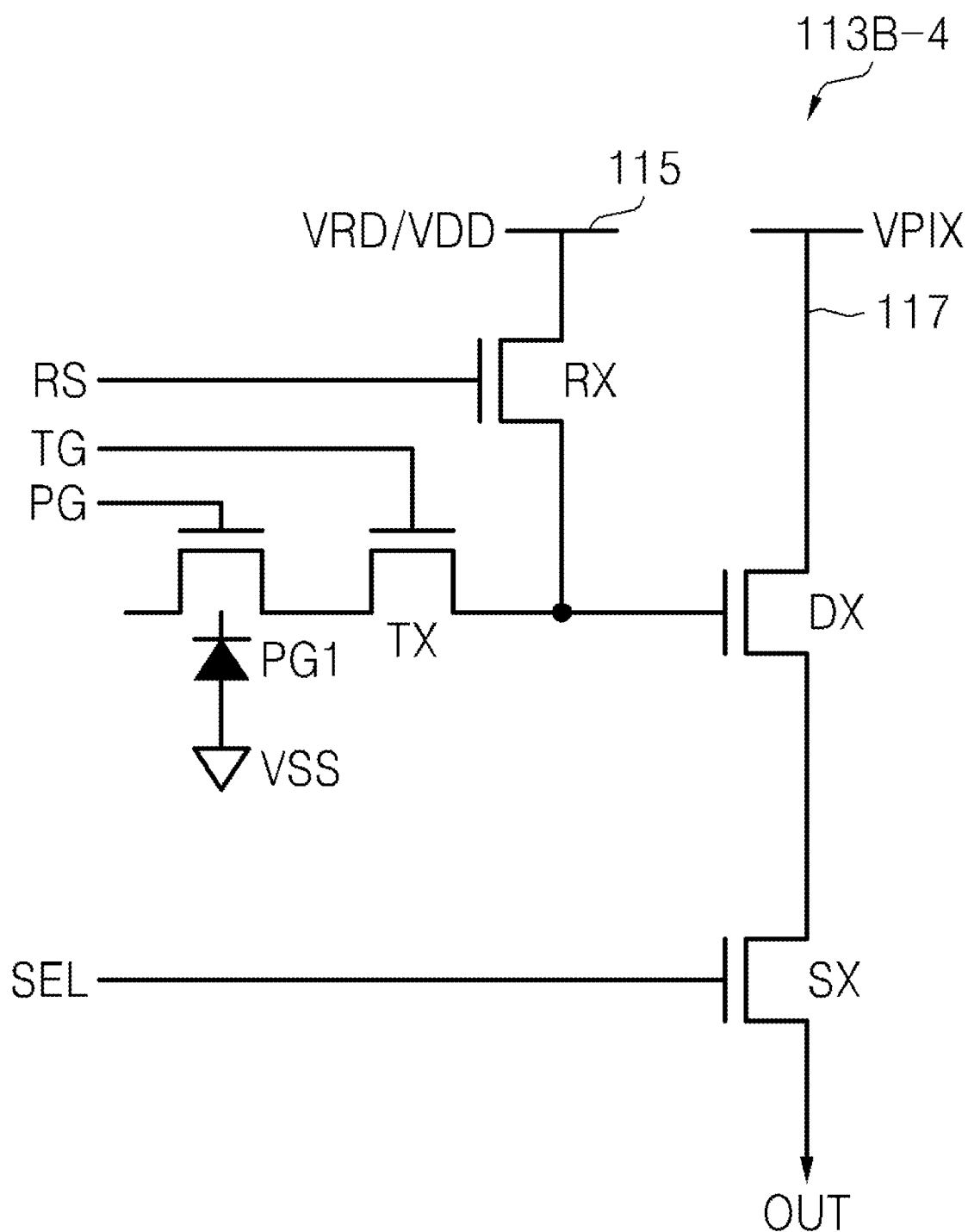
FIG. 16 is still another example embodiment of the circuit diagram of the pixel included in the image sensor of FIG. 12.

FIG. 16 is still another example embodiment of the circuit diagram of the pixel included in the image sensor of FIG. 12. Referring to FIG. 16, a pixel 113B-4 according to still another example embodiment of the pixel 113B included in the pixel array 110B of FIG. 12 is in a photogate structure. The pixel 113B-4 includes one photogate PG1 and four transistors RX, DX, SX, and TX. When each pixel 113B is embodied in a photogate structure, the row driver 130 may generate each control signal RS, SEL, TG, and PG at an appropriate timing.

Referring to FIGS. 14, 15, and 16, a source of the reset transistor RX is connected to the first voltage supply line 115 supplying the first voltage VRD or the second voltage VDD, and a source of the source follower DX is connected to the second voltage supply line 117 supplying the third voltage VPIX.

Figure 17:
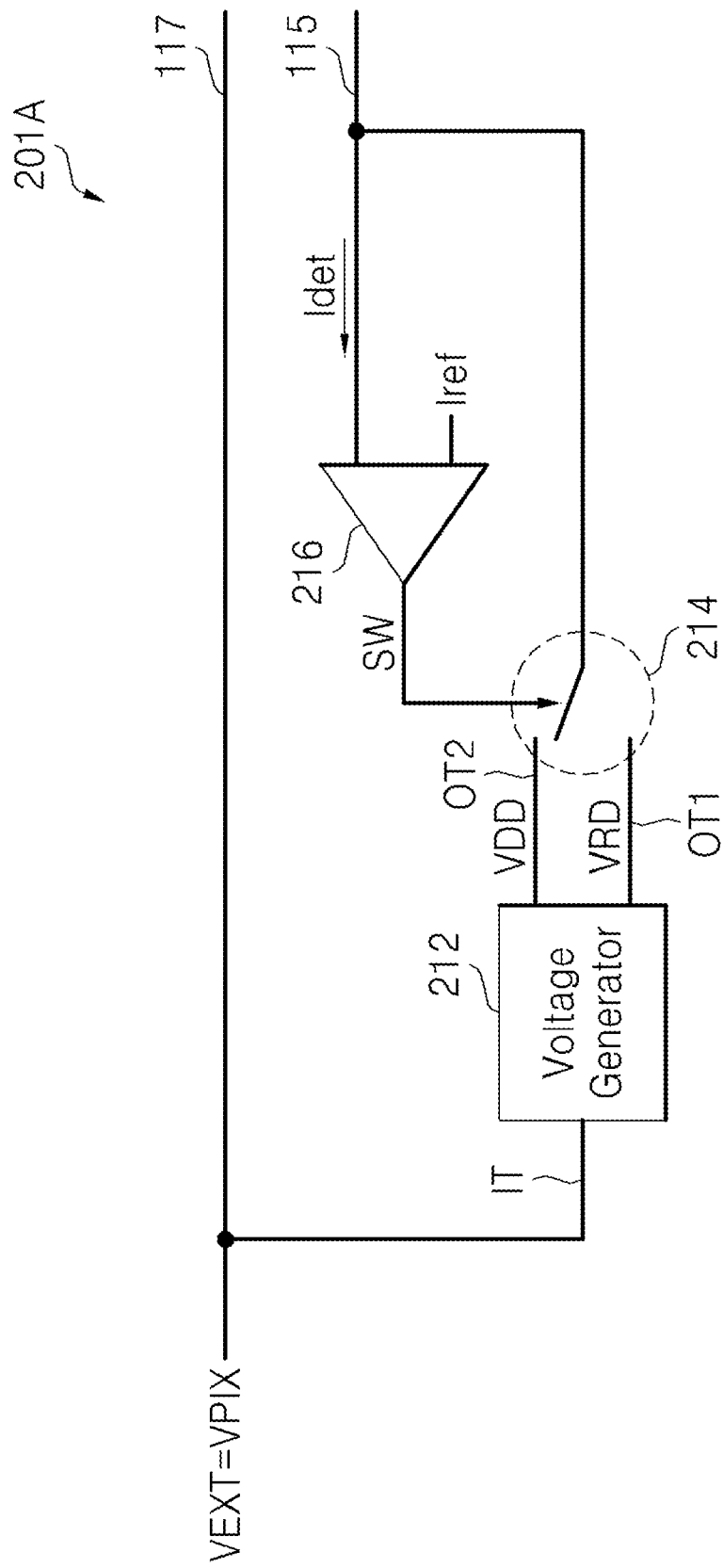
FIG. 17 is an example embodiment of the voltage supply circuit of FIG. 12.

FIG. 17 is an example embodiment of the voltage supply circuit of FIG. 12. Referring to FIGS. 12 and 17, a voltage supply circuit 201A includes a voltage generator 212, a switch 214, and a comparator 216.

The voltage generator 212 includes an input terminal IT which is connected to the second voltage supply line 117, a first output terminal OT1, and a second output terminal OT2. The voltage generator 212 receives the external voltage VEXT, i.e., the third voltage VPIX, through the input terminal IT, and generates the first voltage VRD and the second voltage VDD based on the third voltage VPIX.

The switch 214 supplies the first voltage VRD output through the first output terminal OT1 or the second voltage VDD output through the second output terminal OT2 to the first voltage supply line 115 based on the comparison signal SW. The comparator 216 compares the reference current Iref with the detection current Idet, and outputs the comparison signal SW according to a result of the comparison. For example, the comparator 216 may be embodied in a current comparator, and has a hysteresis characteristic to prevent oscillation.

In a normal illumination environment, that is, when the detection current Idet is smaller than the reference current Iref, the comparator 216 outputs the comparison signal SW for supplying the first voltage VRD to the first voltage supply line 115. However, in a high illumination environment, that is, when the detection current Idet is equal to or greater than the reference current Iref, the comparator 216 outputs the comparison signal SW for supplying the second voltage VDD to the first voltage supply line 115.

Figure 18:
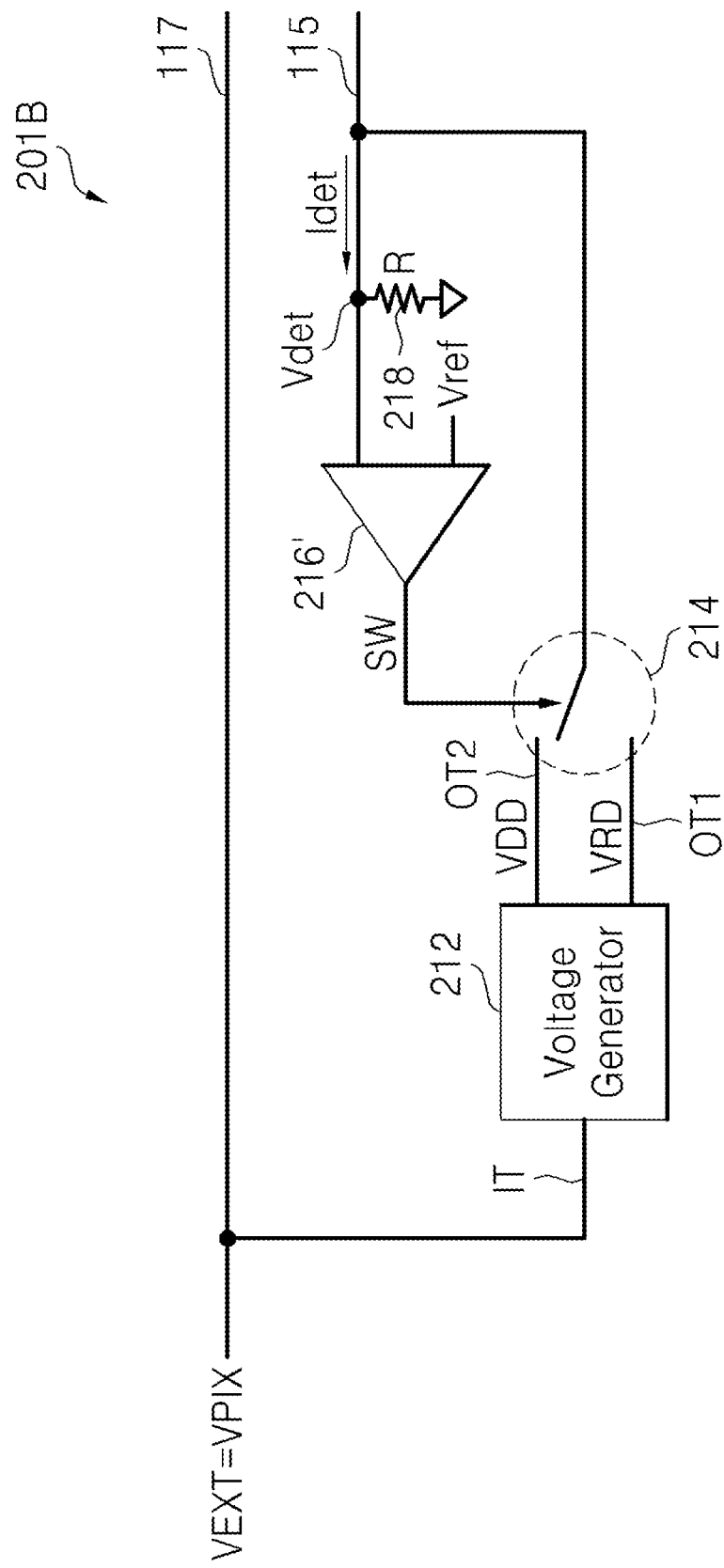
FIG. 18 is another example embodiment of the voltage supply circuit of FIG. 12.

FIG. 18 is another example embodiment of the voltage supply circuit of FIG. 12. Referring to FIGS. 12, 17, and 18, the voltage supply circuit 201B includes a voltage generator 212, a switch 214, a comparator 216', and a resistor circuit 218.

The comparator 216' compares a reference voltage Vref with a detection voltage Vdet, and outputs the comparison signal SW according to a result of the comparison. For example, the comparator 216' may be embodied in a voltage comparator and have a hysteresis characteristic to prevent oscillation. The detection voltage Vdet is determined according to the detection current Idet and a resistance value R of the resistor circuit 218.

In a normal illumination environment, that is, when the detection voltage Vdet is lower than the reference voltage Vref, the comparator 216' outputs the comparison signal SW for supplying the first voltage VRD to the first voltage supply line 115. However, in a high illumination environment, that is, when the detection voltage Vdet is equal to or greater than the reference voltage Vref, the comparator 216' outputs the comparison signal SW for supplying the second voltage VDD to the first voltage supply line 115.

Figure 19:
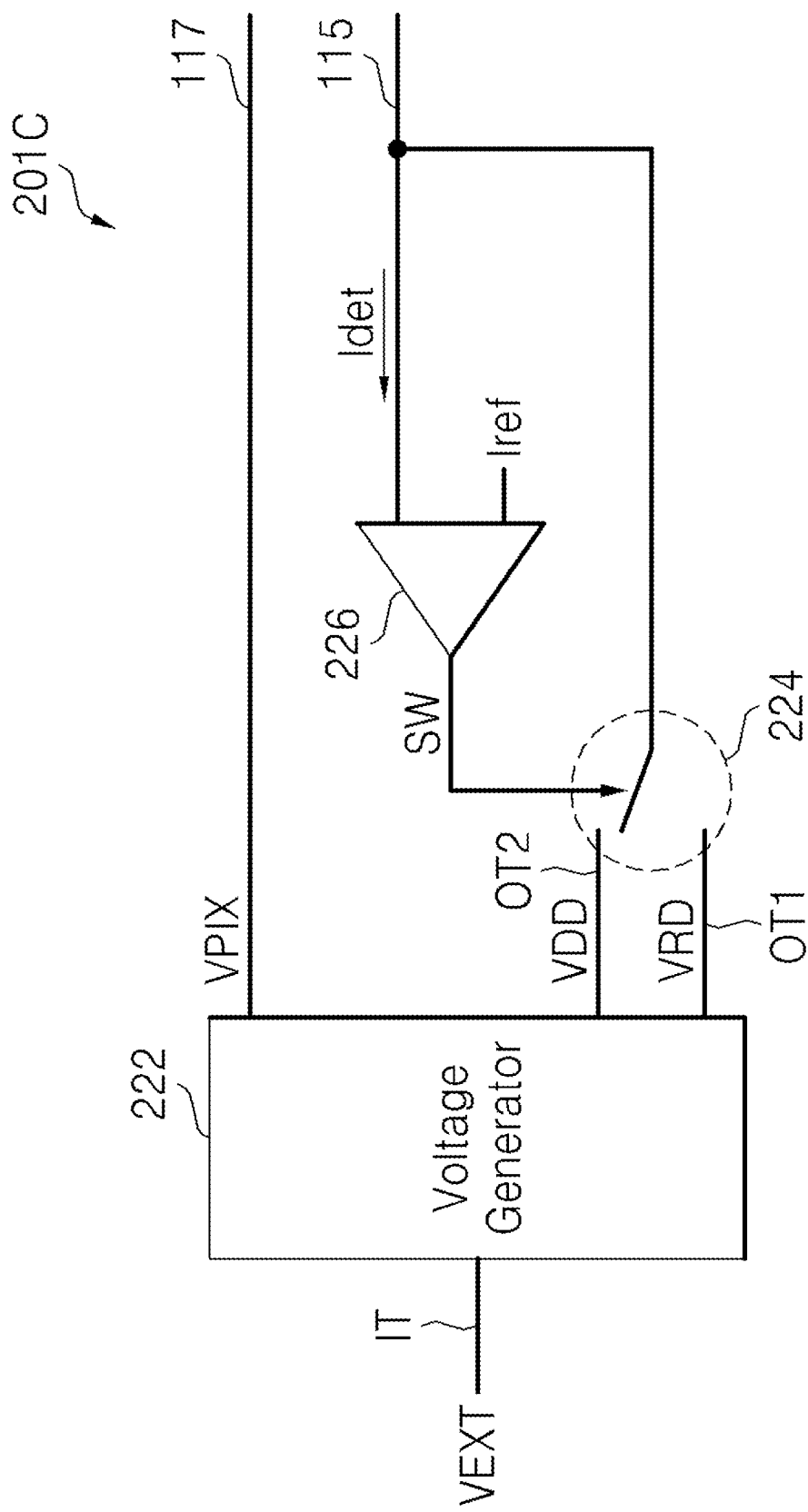
FIG. 19 is still another example embodiment of the voltage supply circuit of FIG. 12.

FIG. 19 is still another example embodiment of the voltage supply circuit of FIG. 12. Referring to FIGS. 12 and 19, a voltage supply circuit 201C includes a voltage generator 222, a switch 224, and a comparator 226.

The voltage generator 222 includes the input terminal IT receiving the external voltage VEXT, the first output terminal OT1, the second output terminal OT2, and a third output terminal outputting the third voltage VPIX to the second voltage supply line 117. The voltage generator 222 generates the first voltage VRD, the second voltage VDD, and the third voltage VPIX based on the external voltage VEXT.

The switch 224 supplies the first voltage VRD output through the first output terminal OT1 or the second voltage VDD output through the second output terminal OT2 to the first voltage supply line 115 based on the comparison signal SW. Here, the third voltage VPIX is supplied to the second voltage supply line 117. A structure and an operation of the comparator 226 of FIG. 19 are substantially the same as the structure and the operation of the comparator 216 of FIG. 17.

Figure 20:
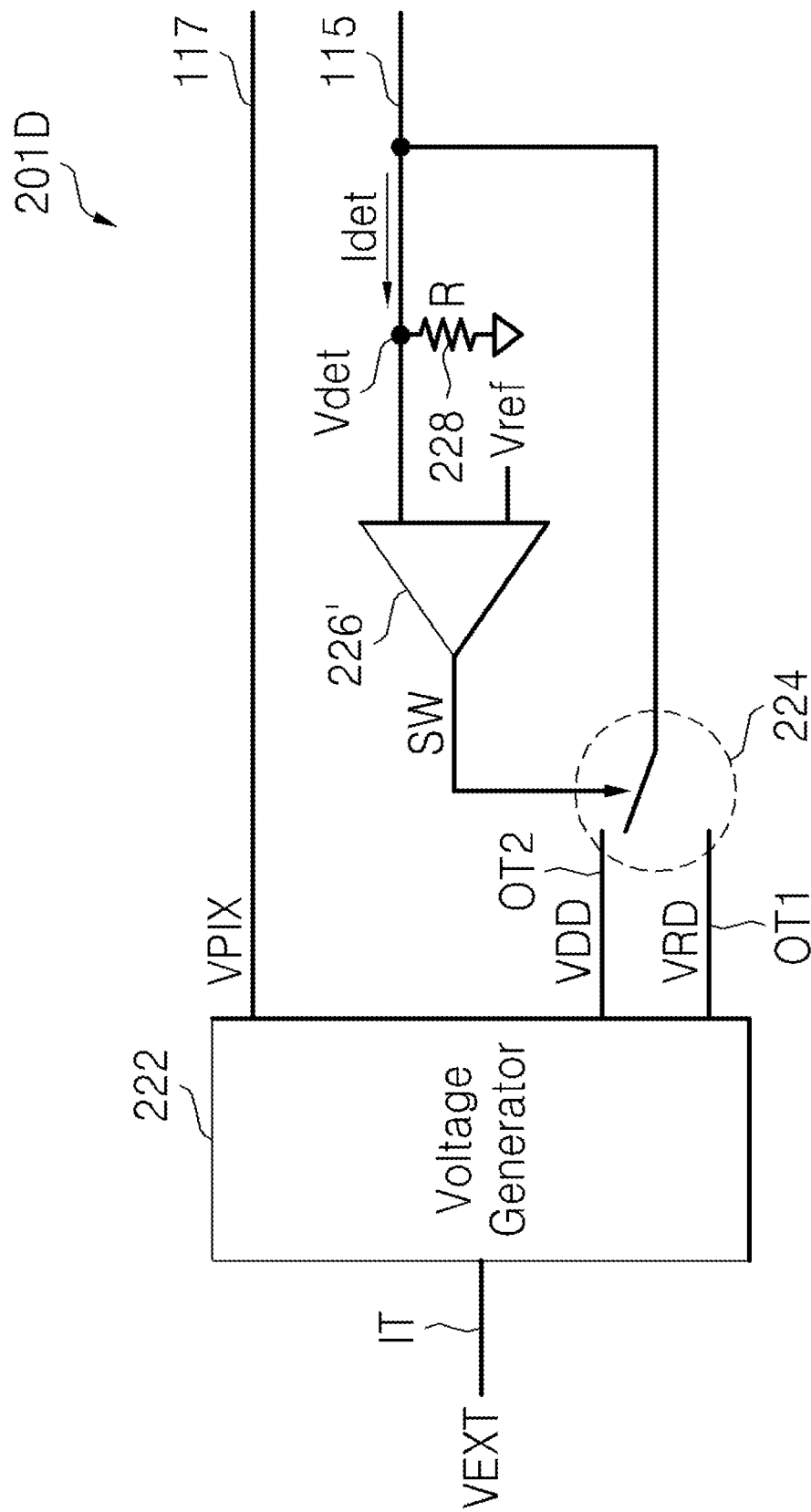
FIG. 20 is still another example embodiment of the voltage supply circuit of FIG. 12.

FIG. 20 is still another example embodiment of the voltage supply circuit of FIG. 12. Referring to FIGS. 12, 19, and 20, a voltage supply circuit 201D includes a voltage generator 222, a switch 224, a comparator 226', and a resistor circuit 228.

A structure and an operation of the comparator 226' of FIG. 20 are substantially the same as the structure and the operation of the comparator 216' of FIG. 18. The detection voltage Vdet is determined according to the detection current Idet and the resistance value R of the resistor circuit 228.

Figure 21:
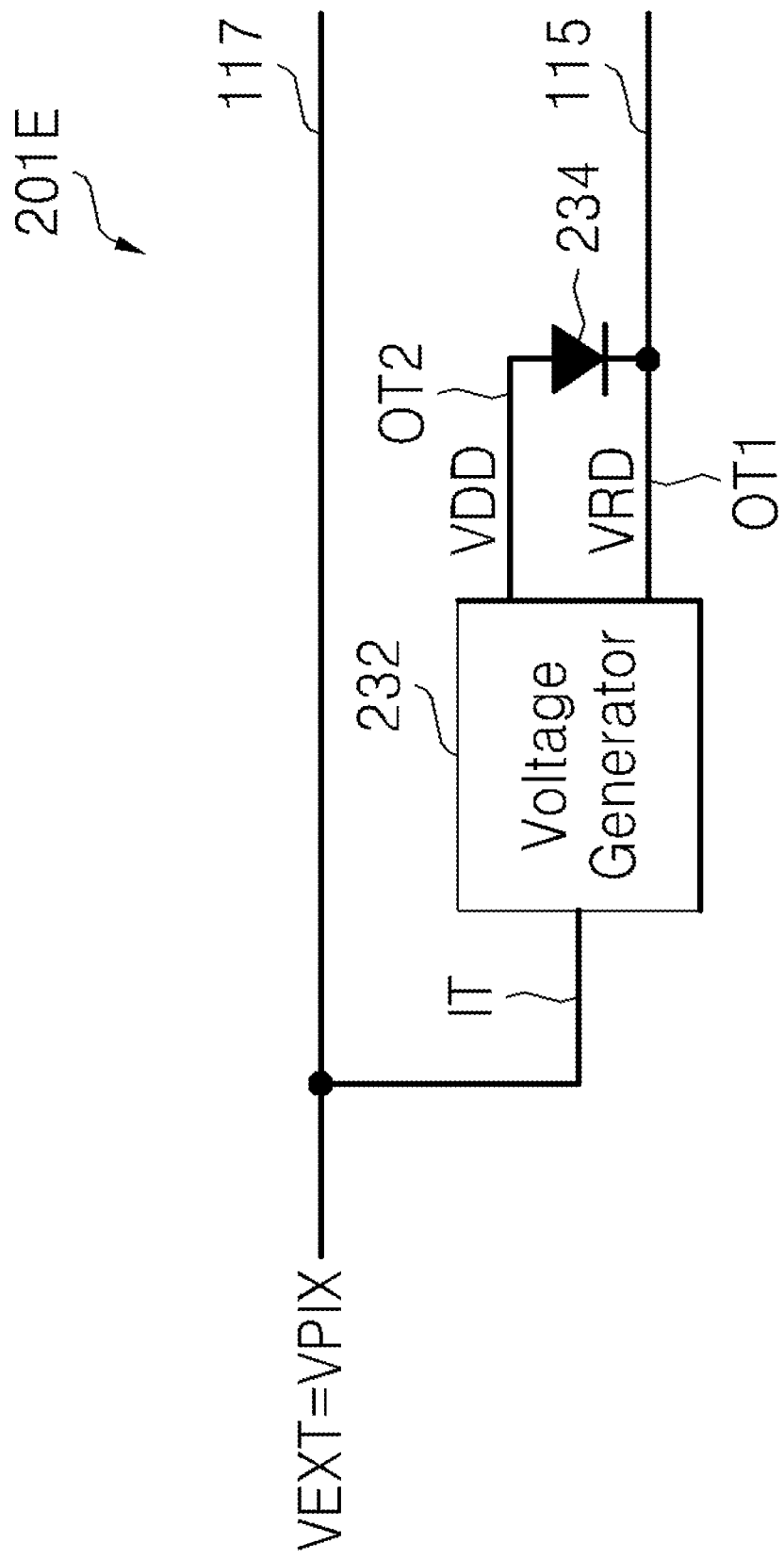
FIG. 21 is still another example embodiment of the voltage supply circuit of FIG. 12.

FIG. 21 is still another example embodiment of the voltage supply circuit of FIG. 12. Referring to FIGS. 12 and 21, a voltage supply circuit 201E includes a voltage generator 232 and a diode 234.

The voltage generator 232 includes the input terminal IT connected to the second voltage supply line 117, the first output terminal OT1 connected to the first voltage supply line 115, and the second output terminal OT2. The voltage generator 232 generates the first voltage VRD and the second voltage VDD based on an external voltage supplied to the second voltage supply line 117, i.e., the third voltage VPIX.

The diode 234 includes a cathode connected to the first output terminal OT1 outputting the first voltage VRD and an anode connected to the second output terminal OT2 outputting the second voltage VDD.

In a normal illumination environment, the first voltage VRD supplied to the pixel array 110B through the first voltage supply line 115 is higher than the second voltage VDD. Therefore, the diode 234 maintains an off state, so that the first voltage VRD is supplied to the pixel array 110B through the first voltage supply line 115. However, since the detection current Idet rapidly increases in a high illumination environment, the first voltage VRD supplied to the pixel array 110B through the first voltage supply line 115 may be lower than the second voltage VDD. Here, the diode 234 is turned on, so that the second voltage VDD may be supplied to the pixel array 110B through the diode 234 and the first voltage supply line 115.

Figure 22:
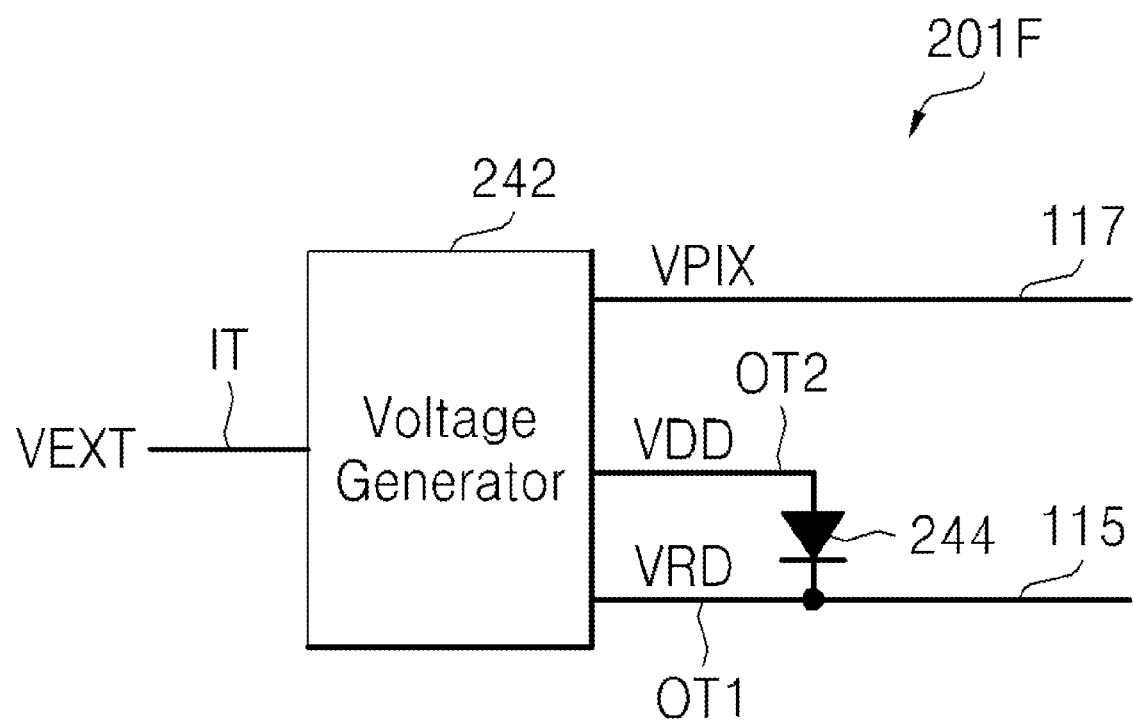
FIG. 22 is still another example embodiment of the voltage supply circuit of FIG. 12.

FIG. 22 is still another example embodiment of the voltage supply circuit of FIG. 12. Referring to FIGS. 12 and 22, a voltage supply circuit 201F includes a voltage generator 242 and a diode 244.

The voltage generator 242 includes the input terminal IT receiving the external voltage VEXT, the first output terminal OT1 connected to the first voltage supply line 115, the second output terminal OT2, and a third output terminal connected to the second voltage supply line 117.

The voltage generator 242 generates the first voltage VRD, the second voltage VDD, and the third voltage VPIX based on the external voltage VEXT. The diode 244 includes a cathode connected to the first output terminal OT1 outputting the first voltage VRD and an anode connected to the second output terminal OT2 outputting the second voltage VDD.

In a normal illumination environment, the first voltage VRD supplied to the pixel array 110B through the first voltage supply line 115 is higher than the second voltage VDD. Accordingly, the diode 234 maintains an off state, so that the first voltage VRD is supplied to the pixel array 110B through the first voltage supply line 115. However, since the detection current Idet rapidly increases in a high illumination environment, the first voltage VRD supplied to the pixel array 110B through the first voltage supply line 115 may be lower than the second voltage VDD. Here, the diode 244 is turned on, so that the second voltage VDD may be supplied to the pixel array 110B through the diode 244 and the first voltage supply line 115.

Figure 23:
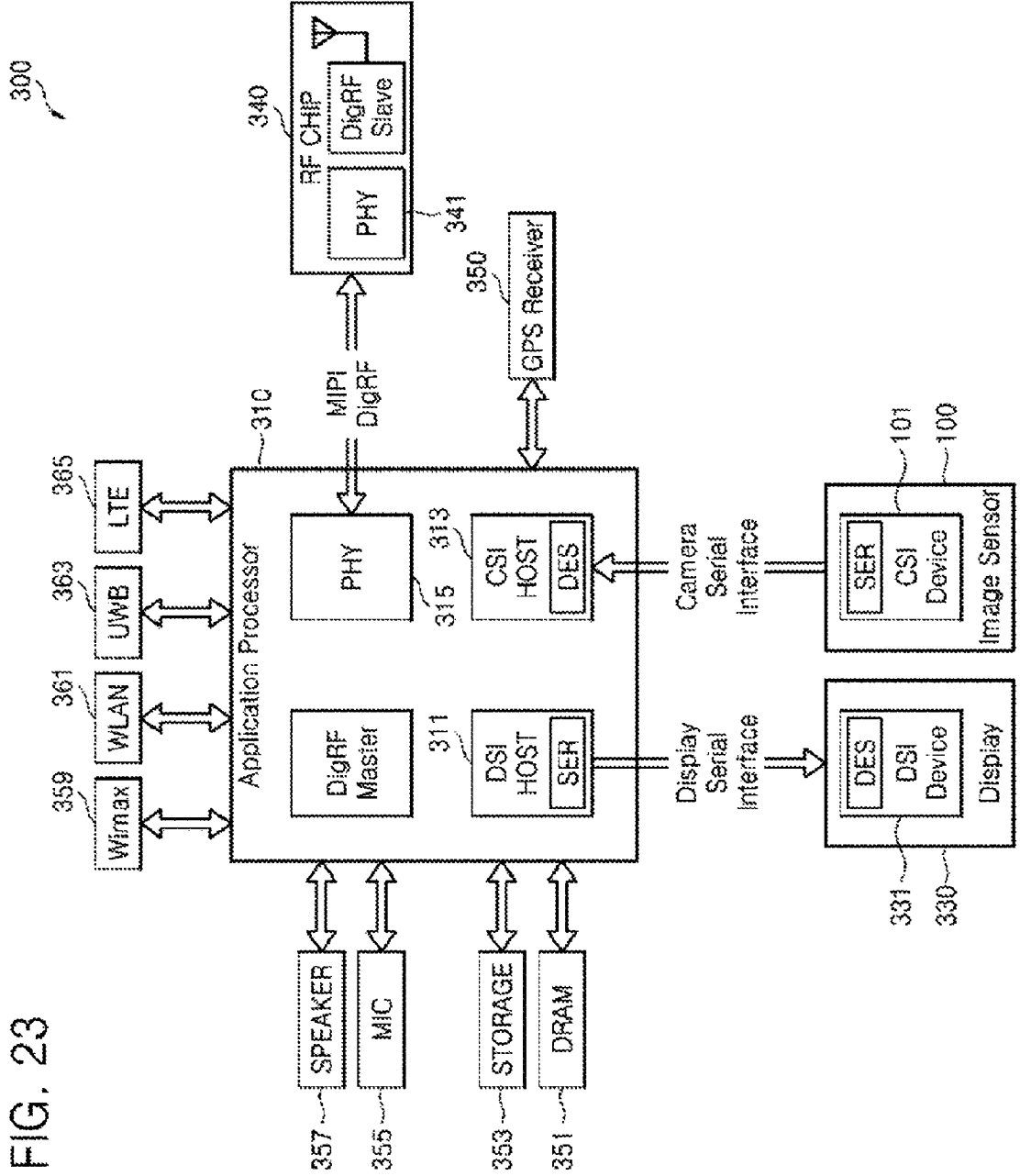
FIG. 23 is an example embodiment of an electronic system including the image sensor of FIG. 1 or 12.

FIG. 23 is an example embodiment of an electronic system including the image sensor of FIG. 1 or 12. Referring to FIGS. 1 and 23, an electronic system 300 may be embodied in a portable electronic device which may use or support a mobile industry processor interface (MIPI®).

The portable electronic device may be embodied in a laptop computer, a personal digital assistant (PDA), a portable media player (PMP), a mobile phone, a smart phone, a tablet computer, a mobile internet device (MID), a wearable computer, an internet of things (IoT) device, an internet of everything (IoE) device, or a digital camera. The electronic system 300 includes an application processor (AP) 310, the image sensor 100A or 100B (collectively 100), and a display 330.

A structure and an operation of the image sensor 100 are described in FIGS. 1 to 22.

A camera serial interface (CSI) host 313 embodied in the AP 310 may perform a serial communication with a CSI device 101 of the image sensor 100 through a camera serial interface CSI. According to an example embodiment, a de-serializer DES may be embodied in the CSI host 313, and a serializer SER may be embodied in the CSI device 101.

A display serial interface (DSI) host 311 embodied in the AP 310 may perform a serial communication with the DSI device 331 of the display 330 through a display serial interface. According to an example embodiment, the serializer SER may be embodied in the DSI host 311, and the de-serializer DES may be embodied in the DSI device 331.

Each of the deserializer DES and the serializer SER may process an electrical signal or a photo signal.

The electronic system 300 may further include a radio frequency (RF) chip 340 which may communicate with the AP 310. A physical layer (PHY) 315 of the AP 310 may transmit or receive data to/from a PHY 341 of the RF chip 340 according to MIPI DigRF.

The electronic system 300 may further include a GPS receiver 350, a memory 351 such as a dynamic random access memory DRAM, a data storage device 353 which is embodied in a non-volatile memory such as a NAND flash-based memory, a microphone 355, or a speaker 357.

The electronic system 300 may communicate with an external device using at least one communication protocol, e.g., worldwide interoperability for microwave access (Wi-MAX) 359, Wireless LAN (WLAN) 361, ultra-wideband (UWB) 363, or long term evolution (LTE™) 365. The electronic system 300 may communicate with an external wireless communication device using Bluetooth or WiFi.

Figure 24:
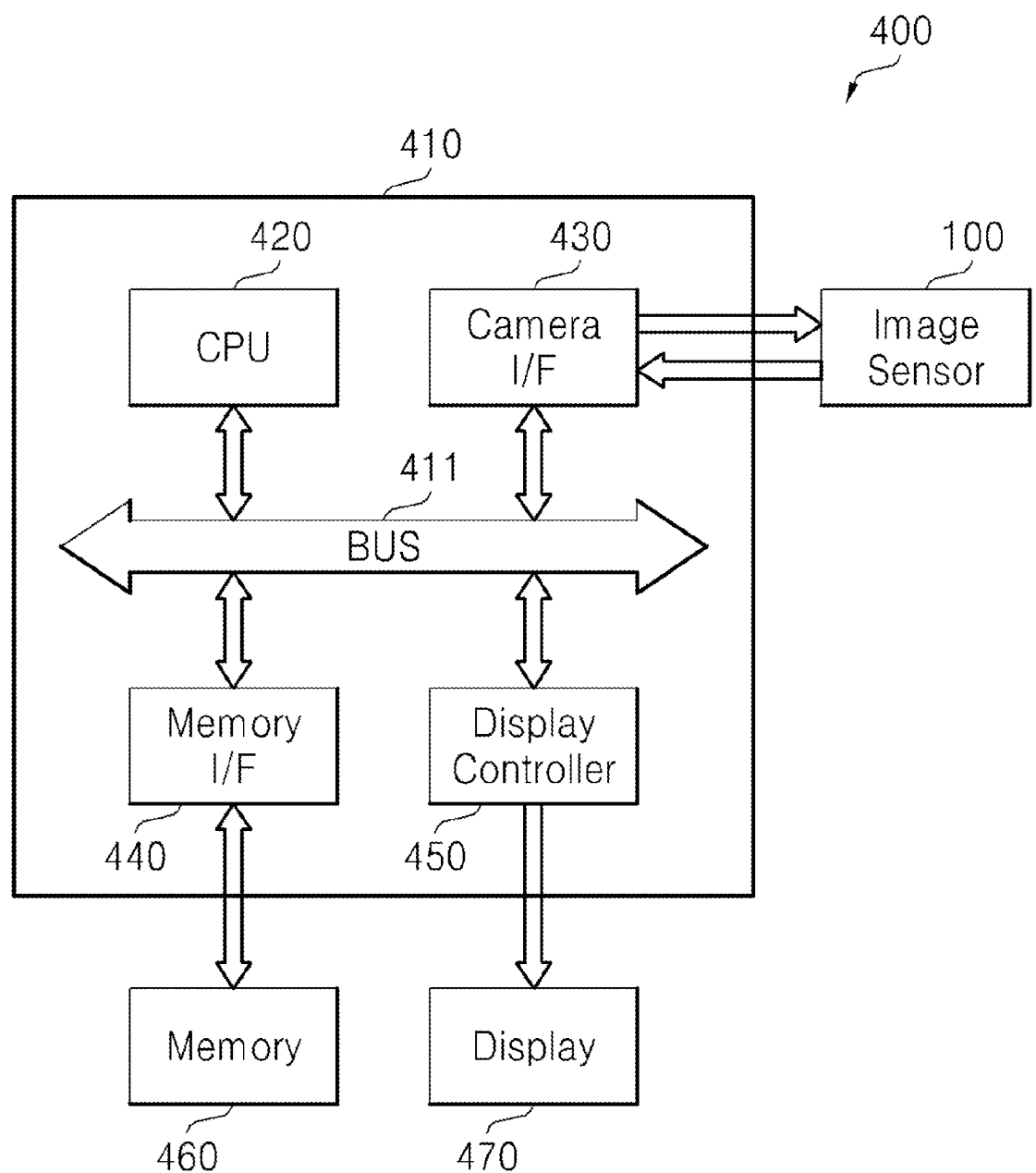
FIG. 24 is another example embodiment of the electronic system including the image sensor of FIG. 1 or 12.

According to an example embodiment, the AP 310 may further include each component 411, 420, 430, 440, and 450 illustrated in FIG. 24.

FIG. 24 is another example embodiment of the electronic system including the image sensor of FIG. 1 or 12. Referring to FIGS. 1 to 22, and 24, an electronic system 400 may be embodied in a personal computer (PC) or a portable electronic device. The portable electronic device may be embodied in a laptop computer, a PDA, a PMP, a mobile phone, a smart phone, a table PC, a mobile internet device (MID), a camcorder, or a digital camera.

The electronic system 400 may include the image sensor 100, the processor 410, a memory 460, and a display or display device 470.

The image sensor 100 may be included in a camera module. The camera module may include a mechanical component which may control an operation of the image sensor 100. The processor 410 may be embodied in an integrated circuit, a system on chip (SoC), an application processor, or a mobile application processor.

The processor 410 may control an operation of the image sensor 100, the memory 460, and the display 470, process image data output from the image sensor 100, and store the processed image data in the memory 460 or display the processed image data through the display 470. The processor 410 includes a central processing unit (CPU) 420, a camera interface 430, a memory interface 440, and a display controller 460.

The CPU 420 may control operations of the camera interface 430, the memory interface 440, and the display controller 460 through a bus 411. The CPU 420 may be embodied in a multi-core processor or a multi-CPU.

The camera interface 430, according to a control of the CPU 420, may transmit control signals for controlling the image sensor 100 to the image sensor 100, and transmit image data output from the image sensor 100 to the CPU 420, the memory interface 440, and/or the display controller 460.

The memory interface 440 may interface data transmitted or received between the processor 410 and the memory 460. The display controller 460 may transmit data to be displayed on the display 470 to the display 470.

The memory 460 may be a volatile memory like a DRAM or a flash-based memory. The flash-based memory may be embodied in a multimedia card (MMC), an embedded MMC (eMMC), an embedded solid state drive (eSSD), or a universal flash storage (UFS).

Figure 25:
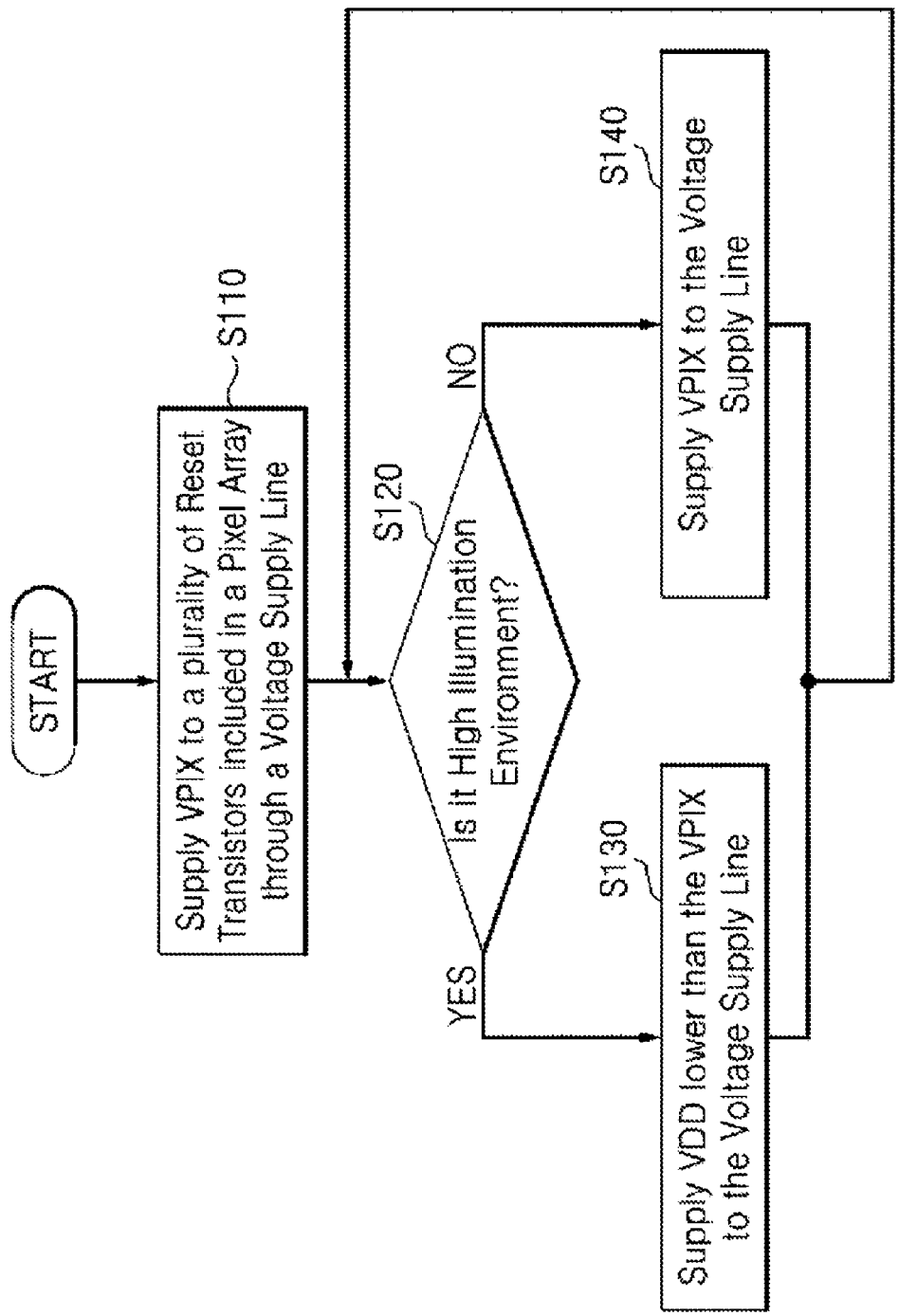
FIG. 25 is a flowchart for describing an operation of the image sensor included in FIG. 1, 23, or 24.

FIG. 25 is a flowchart for describing an operation of the image sensor included in FIG. 1, 23, or 24. Referring to FIGS. 1 to 11, and 23 to 25, the first voltage VPIX is supplied to the reset transistor RX and the source follower DX included in a plurality of pixels 113A embodied in the pixel array 110A via a voltage supply line 111 (S110).

The voltage supply circuit 200A to 200F (collectively 200), determines whether an image sensor 100A operates in a high illumination environment based on the detection current Idet or a voltage level of the voltage supply line 111 (S120).

When the image sensor 100A operates in the high illumination environment, the voltage supply circuit 200 supplies the second voltage VDD which is lower than the first voltage VPIX to the reset transistor RX and the source follower DX of each pixel 113A embodied in the pixel array 110A through the supply line 111 so as to protect the voltage supply line 111 (S130).

However, when the image sensor 100A does not operate in the high illumination environment, the voltage supply circuit 200 supplies the first voltage VPIX to the reset transistor RX and the source follower DX of each pixel 113A embodied in the pixel array 110A through the voltage supply line 111 (S140).

The image sensor 100A may monitor an illumination environment, and adaptively supply one of the first voltage VPIX and the second voltage VDD to the reset transistor RX and the source follower DX of each pixel 113A based on the illumination change (or variation).

Figure 26:
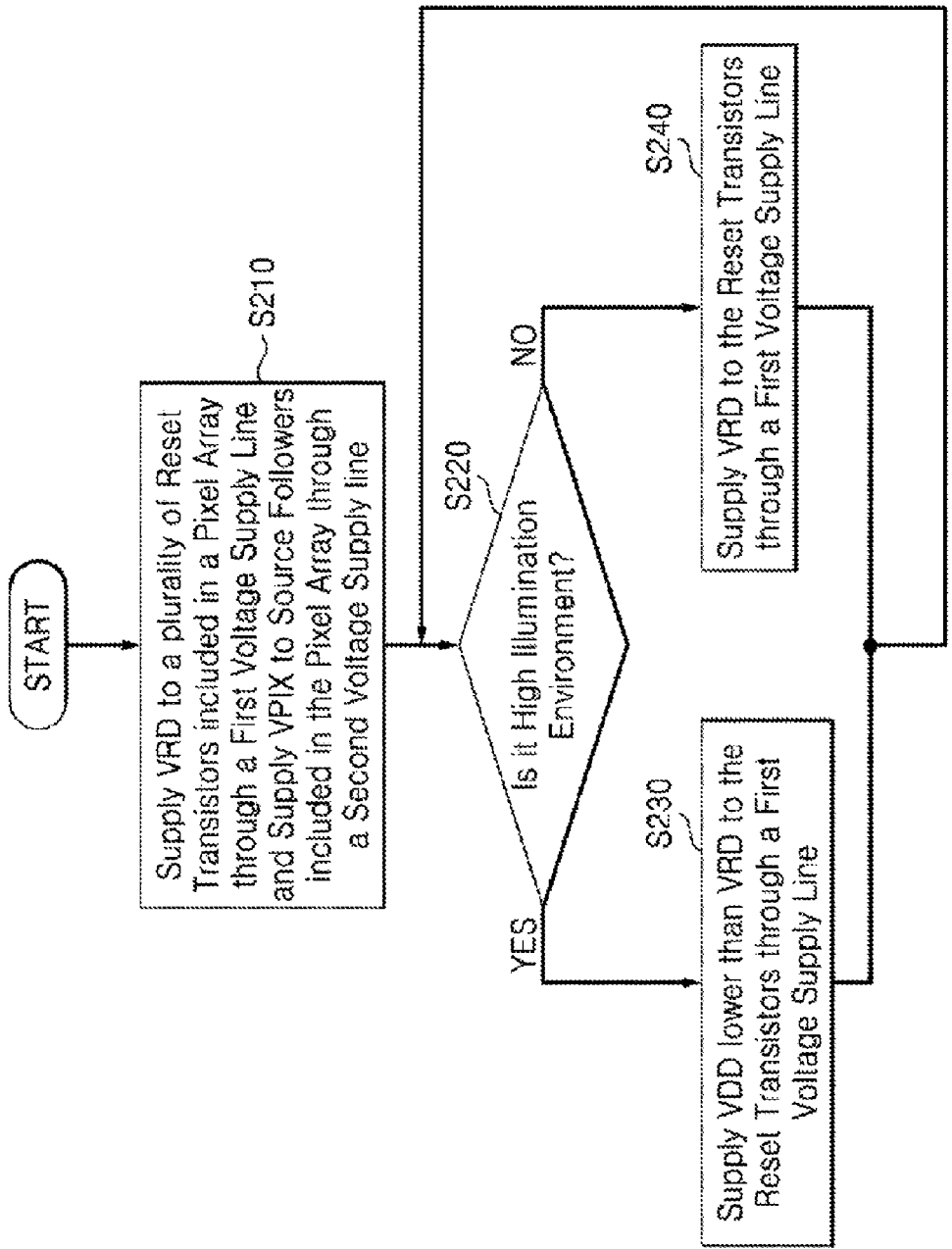
FIG. 26 is a flowchart for describing an operation of the image sensor included in FIG. 12, 23, or 24.

FIG. 26 is a flowchart for describing an operation of the image sensor included in FIG. 12, 23, or 24. Referring to FIGS. 12 to 24, and 26, the first voltage VRD is supplied to the reset transistor RX included in the plurality of pixels 113B embodied in the pixel array 110B through a first voltage supply line 115, and a third voltage VPIX is supplied to the source follower DX included in the plurality of pixels 113B embodied in the pixel array 110B through a second voltage supply line 117 (S210).

The voltage supply circuit 201A to 201F (collectively 201) determines whether the image sensor 100B operates in a high illumination environment based on the detection current Idet or a voltage level of the first voltage supply line 115 (S220).

When the image sensor 100B operates in the high illumination environment, the voltage supply circuit 201 supplies the second voltage VDD which is lower than the first voltage VRD to the reset transistor RX of each pixel 113B embodied in the pixel array 110B through the first voltage supply line 115 so as to protect the first voltage supply line 115 (S230). Here, the voltage supply circuit 201 may maintain the third voltage VPIX supplied to the source follower DX of each pixel 113B as it is.

However, when the image sensor 110B does not operate in the high illumination environment, the voltage supply circuit 201 supplies the first voltage VRD to the reset transistor RX of each pixel 113B embodied in the pixel array 110B through the first voltage supply line 115 (S240). Here, the voltage supply circuit 201 may maintain the third voltage VPIX supplied to the source follower DX of each pixel 113B as it is.

The image sensor 100B may monitor an illumination environment, and adaptively supply one of the first voltage VRD and the second voltage VDD to the reset transistor RX of each pixel 113B based on the illumination change.

An image sensor according to an example embodiment of inventive concepts may supply one of a plurality of operation voltages to a reset transistor included in each of a plurality of pixels of a pixel array based on the illumination change (or variation). Accordingly, the image sensor may protect a voltage supply line supplying an operation voltage to a reset transistor included in each of the plurality of pixels in a high illumination.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. An image sensor comprising:
   a pixel array including a plurality of pixels;
   a row driver configured to control an operation of each of the plurality of pixels;
   a first voltage supply line connected to a reset transistor in each of the plurality of pixels; and
   a voltage supply circuit configured to detect a signal from the first voltage supply line and supply one of a first voltage and a second voltage to the first voltage supply line based on the signal from the first voltage supply line.

2. The image sensor of claim 1, wherein the voltage supply circuit includes:
   a comparator configured to compare a reference signal with the signal from the first voltage supply line and generate a comparison signal;
   a voltage generator configured to generate the second voltage based on the first voltage; and
   a switch configured to supply the one of the first voltage and the second voltage to the first voltage supply line based on the comparison signal.

3. The image sensor of claim 1, wherein the voltage supply circuit includes:
   a comparator configured to compare a reference signal with the signal from the first voltage supply line and generate a comparison signal;
   a voltage generator configured to generate the first voltage and the second voltage based on an external voltage; and
   a switch configured to supply the one of the first voltage and the second voltage to the first voltage supply line based on the comparison signal.

4. The image sensor of claim 1, wherein the voltage supply circuit includes:
   a voltage generator having an input terminal and an output terminal, the input terminal connected to the first voltage supply line, the input terminal configured to receive the first voltage, the voltage generator configured to generate the second voltage based on the first voltage and output the second voltage through the output terminal; and
   a diode having a cathode and an anode, the cathode connected to the first voltage supply line and the anode connected to the output terminal.

5. The image sensor of claim 1, wherein the voltage supply circuit includes:
   a voltage generator configured to generate the first voltage and the second voltage based on an external voltage, output the first voltage through a first output terminal connected to the first voltage supply line, and output the second voltage through a second output terminal; and
   a diode having a cathode and an anode, the cathode connected to the first voltage supply line and the anode connected to the second output terminal.

6. The image sensor of claim 1, wherein each of the plurality of pixels further includes a source follower connected to a second voltage supply line configured to supply a third voltage, and
   the voltage supply circuit includes:
   a comparator configured to compare a reference signal with the signal from the first voltage supply line and generate a comparison signal;
   a voltage generator configured to generate the first voltage and the second voltage based on the third voltage; and
   a switch configured to supply the one of the first voltage and the second voltage to the first voltage supply line based on the comparison signal.

7. The image sensor of claim 1, wherein each of the plurality of pixels further includes a source follower connected to a second voltage supply line configured to supply a third voltage, and
   the voltage supply circuit includes:
   a comparator configured to compare a reference signal with the signal from the first voltage supply line and generate a comparison signal;
   a voltage generator configured to generate the first voltage, the second voltage, and the third voltage based on an external voltage; and
   a switch configured to supply the one of the first voltage and the second voltage to the first voltage supply line based on the comparison signal.

8. The image sensor of claim 1, wherein each of the plurality of pixels further includes a source follower connected to a second voltage supply line configured to supply a third voltage, and
   the voltage supply circuit includes:
   a voltage generator having an input terminal, a first output terminal and a second output terminal, the input terminal connected to the second voltage supply line, the first output terminal connected to the first voltage supply line, the voltage generator configured to generate the first voltage and the second voltage based on the third voltage, output the first voltage through the first output terminal, and output the second voltage through the second output terminal; and
   a diode having a cathode and an anode, the cathode connected to the first voltage supply line and the anode connected to the second output terminal.

9. The image sensor of claim 1, wherein each of the plurality of pixels further includes a source follower connected to a second voltage supply line configured to supply a third voltage,
   wherein the voltage supply circuit includes:
   a voltage generator configured to generate the first voltage, the second voltage, and the third voltage based on an external voltage, output the first voltage through a first output terminal connected to the first voltage supply line, output the second voltage through a second output terminal, and output the third voltage to the second voltage supply line; and
   a diode having a cathode and an anode, the cathode connected to the first voltage supply line and the anode connected to the second output terminal.

10. The image sensor of claim 1, wherein the first voltage is higher than the second voltage.

11. An image processing device comprising:
    an image sensor configured to output data;
    a display device; and a processor configured to process the data output from the image sensor, and transmit the processed data to the display device, wherein the image sensor includes,
a pixel array including a plurality of pixels,
a row driver configured to control an operation of each of the plurality of pixels,
a first voltage supply line connected to a reset transistor in each of the plurality of pixels, and
a voltage supply circuit configured to detect a signal from the first voltage supply line, and supply one of a first voltage and a second voltage to the first voltage supply line based on the signal from the first voltage supply line.

12. The image processing device of claim 11, wherein the voltage supply circuit includes:
a comparator configured to compare a reference signal with the signal from the first voltage supply line and generate a comparison signal;
a voltage generator configured to generate the second voltage based on the first voltage; and
a switch configured to supply the one of the first voltage and the second voltage to the first voltage supply line based on the comparison signal.

13. The image processing device of claim 12, wherein the comparator is a comparator having a hysteresis characteristic.

14. The image processing device of claim 11, wherein the voltage supply circuit includes:
a voltage generator having an input terminal and an output terminal, the input terminal connected to the first voltage supply line, the input terminal configured to receive the first voltage, the voltage generator configured to generate the second voltage based on the first voltage, and output the second voltage through the output terminal; and
a diode having a cathode and an anode, the cathode connected to the first voltage supply line and the anode connected to the output terminal.

15. The image processing device of claim 11, wherein each of the plurality of pixels further includes a source follower connected to a second voltage supply line configured to supply a third voltage, and
the voltage supply circuit includes:
a comparator configured to compare a reference signal with the signal from the first voltage supply line and generate a comparison signal;
a voltage generator configured to generate the first voltage and the second voltage based on the third voltage; and
a switch configured to supply the one of the first voltage and the second voltage to the first voltage supply line based on the comparison signal,
wherein the reference signal and the signal are one of a voltage and a current.

16. The image processing device of claim 15, wherein the first voltage is higher than the third voltage and the third voltage is higher than the second voltage.

17. The image processing device of claim 11, wherein each of the plurality of pixels further includes a source follower connected to a second voltage supply line configured to supply a third voltage, and the voltage supply circuit includes:
a voltage generator having an input terminal, a first output terminal and a second output terminal, the input terminal connected to the second voltage supply line, the first output terminal connected to the first voltage supply line, the voltage generator configured to generate the first voltage and the second voltage based on the third voltage, output the first voltage through the first output terminal, and output the second voltage through the second output terminal; and
a diode having a cathode and an anode, the cathode connected to the first voltage supply line and the anode connected to the second output terminal.

* * * * *